(12) United States Patent
Holzmann et al.

(10) Patent No.: US 11,547,965 B2
(45) Date of Patent: Jan. 10, 2023

(54) CURVED LOBED SEAL LOCK AIR FILTER SYSTEM

(71) Applicant: Cummins Filtration IP, Inc., Columbus, IN (US)

(72) Inventors: Mark V. Holzmann, Stoughton, WI (US); Ken Tofsland, Stoughton, WI (US); Scott Gerald Manke, Sun Prairie, WI (US); Wesley J Martin, Pueblo, CO (US); Benjamin L. Scheckel, Stoughton, WI (US); Joseph Appelhans, Belvidere, IL (US); Guiliang Zheng, West Lafayette, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 17/610,110

(22) PCT Filed: May 8, 2020

(86) PCT No.: PCT/US2020/031997
§ 371 (c)(1),
(2) Date: Nov. 9, 2021

(87) PCT Pub. No.: WO2020/231769
PCT Pub. Date: Nov. 19, 2020

(65) Prior Publication Data
US 2022/0143540 A1 May 12, 2022

Related U.S. Application Data

(60) Provisional application No. 62/847,682, filed on May 14, 2019.

(51) Int. Cl.
*B01D 46/00* (2022.01)
*B01D 46/24* (2006.01)
*F16J 15/06* (2006.01)

(52) U.S. Cl.
CPC ..... *B01D 46/2414* (2013.01); *B01D 46/0004* (2013.01); *F16J 15/062* (2013.01); *B01D 2265/022* (2013.01); *B01D 2271/02* (2013.01)

(58) Field of Classification Search
CPC ............. B01D 46/0004; B01D 46/521; B01D 46/527; B01D 46/2411; B01D 46/2414;
(Continued)

(56) References Cited

U.S. PATENT DOCUMENTS 4,720,292 A 1/1988 Engel et al.
5,484,466 A 1/1996 Brown et al.
(Continued)

FOREIGN PATENT DOCUMENTS

CN 101451614 6/2009
CN 102227246 10/2011
(Continued)

OTHER PUBLICATIONS

First Office Action issued for Chinese Patent Application No. CN 202080034402.7 dated Mar. 31, 2022, 7 pages.
(Continued)

*Primary Examiner* — Minh Chau T Pham
(74) *Attorney, Agent, or Firm* — Foley & Lardner LLP

(57) ABSTRACT

Various embodiments provide for a filter assembly. The filter assembly includes a filter housing, a filter element, and a cover. The cover includes a first cover end and a second cover end disposed axially away from the first cover end. A second coupling member is adjacent to the second cover end. The second coupling member is configured to engage a first coupling member to couple the cover and the filter (Continued)

housing. A biasing member is coupled to the first cover end. An interface plate is configured to press against a first endplate of the filter element to secure the engagement of a first engagement portion of a filter seal member of the filter element and a second engagement portion of a housing seal member of the filter housing.

20 Claims, 28 Drawing Sheets

(58) Field of Classification Search
CPC .......... B01D 2265/022; B01D 2271/02; B01D 29/58; F02M 37/28
USPC ........... 55/497, 498, 482, 502, 529; 210/450
See application file for complete search history.

(56) References Cited

U.S. PATENT DOCUMENTS

| | | | |
|---|---|---|---|
| 5,660,771 | A | 8/1997 | Dunfee et al. |
| 5,891,337 | A | 4/1999 | Keller et al. |
| 6,447,567 | B1 | 9/2002 | Ehrenberg |
| 6,955,701 | B2 | 10/2005 | Schrage |
| 7,122,120 | B2 * | 10/2006 | Diel ........................ B01D 46/64 |
| | | | 210/450 |
| 8,916,044 | B2 | 12/2014 | Rapin |
| 9,089,084 | B2 | 7/2015 | Ukai et al. |
| 9,636,615 | B2 | 5/2017 | Osendorf et al. |
| 9,919,254 | B2 | 3/2018 | Campbell et al. |
| 2005/0178706 | A1 * | 8/2005 | Bagci ................... B01D 35/147 |
| | | | 210/450 |
| 2006/0090434 | A1 | 5/2006 | Brown et al. |
| 2007/0289915 | A1 * | 12/2007 | Jiang ...................... F02M 37/28 |
| | | | 210/450 |
| 2009/0294351 | A1 * | 12/2009 | Herman .................. B01D 35/30 |
| | | | 210/457 |
| 2009/0320424 | A1 | 12/2009 | Merritt et al. |
| 2010/0330224 | A1 | 12/2010 | Hung |
| 2013/0091812 | A1 | 4/2013 | Smith |
| 2013/0263744 | A1 * | 10/2013 | Osendorf ............. B01D 46/527 |
| | | | 55/497 |
| 2013/0305672 | A1 | 11/2013 | Adkins et al. |
| 2015/0101295 | A1 * | 4/2015 | Thompson ............. B01D 29/58 |
| | | | 55/482 |
| 2015/0101298 | A1 * | 4/2015 | Osendorf ............. B01D 46/527 |
| | | | 55/502 |
| 2015/0328575 | A1 * | 11/2015 | Campbell .......... B01D 46/2414 |
| | | | 55/498 |
| 2016/0144310 | A1 * | 5/2016 | Movia .................. B01D 46/521 |
| | | | 55/498 |
| 2016/0325483 | A1 | 11/2016 | Langlois et al. |
| 2017/0151693 | A1 | 6/2017 | Kastner |

FOREIGN PATENT DOCUMENTS

| | | |
|---|---|---|
| CN | 204172257 U | 2/2015 |
| CN | 104736216 | 6/2015 |
| CN | 104994930 | 10/2015 |
| CN | 205230807 U | 5/2016 |
| CN | 106142396 | 11/2016 |
| DE | 10248907 A1 | 4/2004 |
| DE | 10 2014 011 536 | 2/2015 |
| EP | 0 213 930 | 3/1987 |
| ES | 456440 | 2/1977 |
| FR | 2288543 | 5/1976 |
| IN | 2005KOLNP02521 A1 | 7/2006 |
| JP | 49-100189 | 9/1974 |
| JP | H780863 | 3/1993 |
| JP | H732376 | 2/1995 |
| JP | 2007-237177 | 9/2007 |
| KR | 20150116976 | 10/2015 |
| WO | WO-01/10532 | 2/2001 |
| WO | WO-2013/123657 A1 | 8/2013 |
| WO | WO-2018/156489 A1 | 8/2018 |
| WO | WO-2020/112536 A1 | 6/2020 |

OTHER PUBLICATIONS

Office Action issued for Chinese Patent Application No. CN 201980077208.4 dated Feb. 25, 2022, 9 pages.
International Search Report and Written Opinion Issued for PCT Application No. PCT/US2020/031997 dated Jul. 31, 2020, 8 pages.
International Search Report and Written Opinion issued for PCT Application No. PCT/US2019/062781 dated Jan. 27, 2020, 8 pages.
Office Action issued for German Patent Application No. 11 2020 002 530.6 dated Aug. 26, 2022, 12 pages including translation.

* cited by examiner

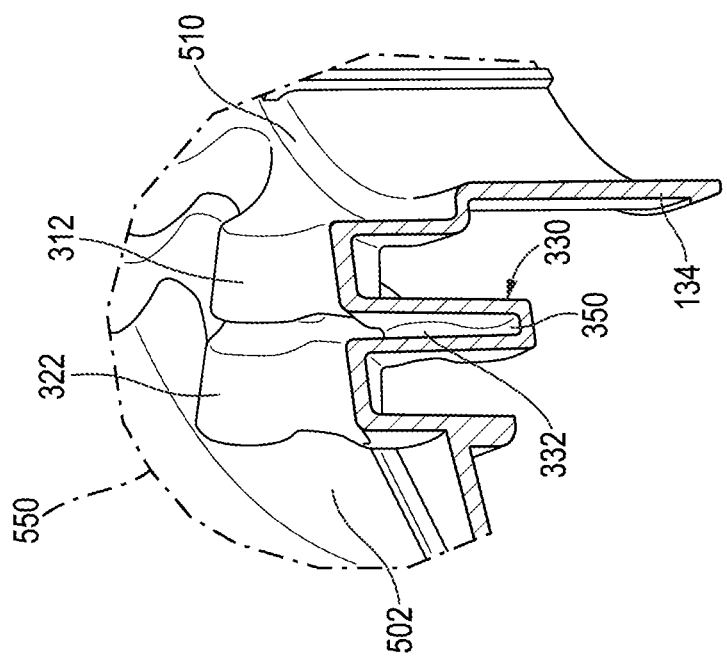
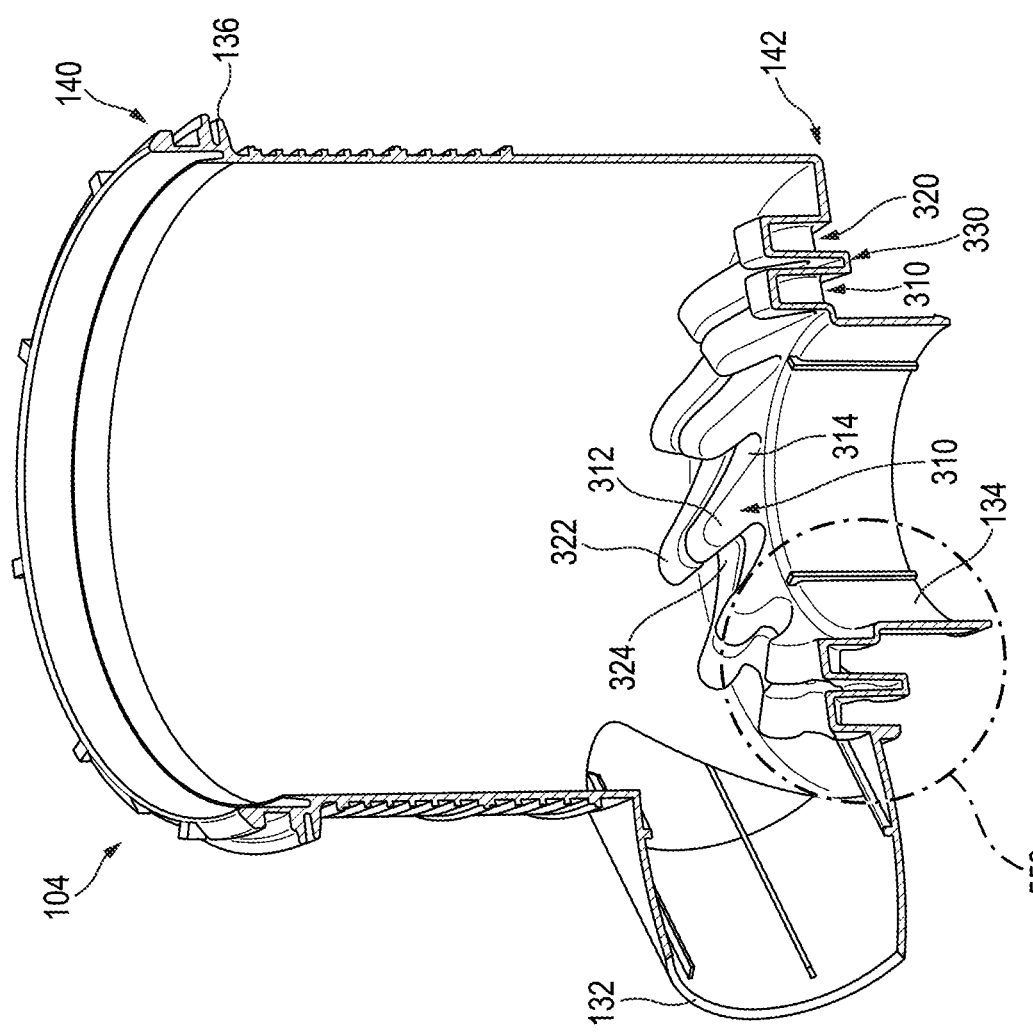

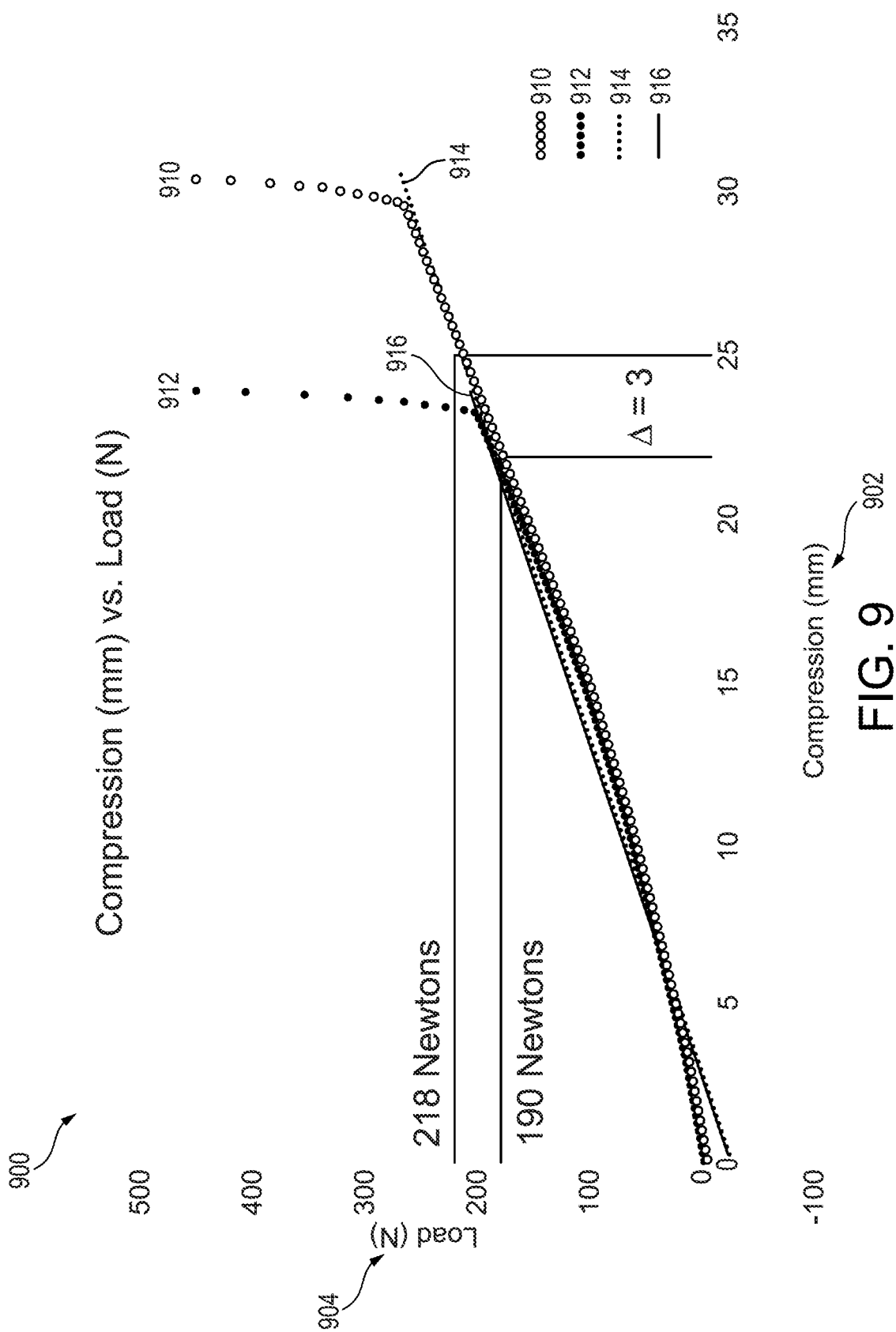

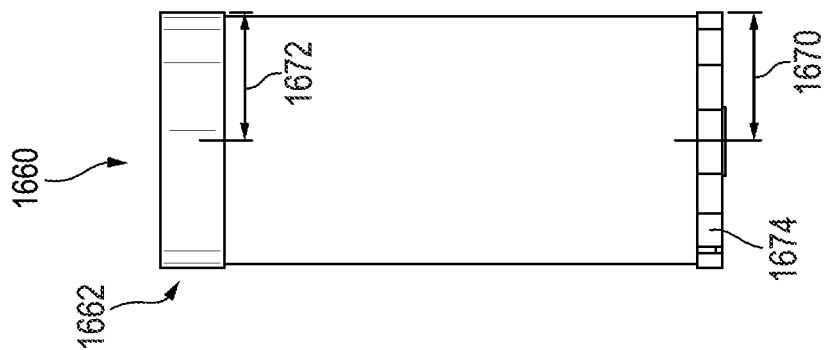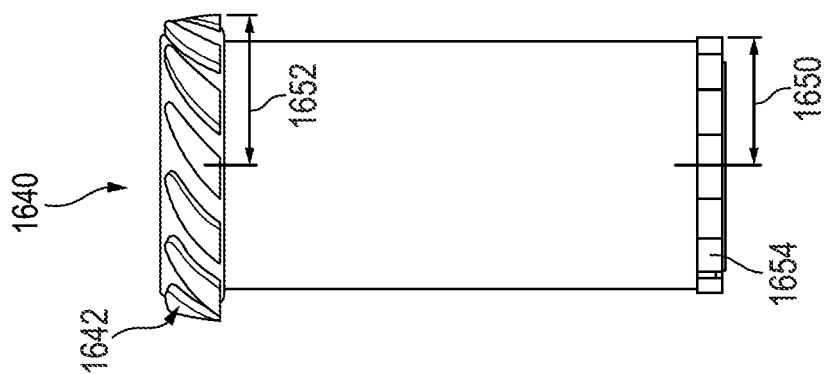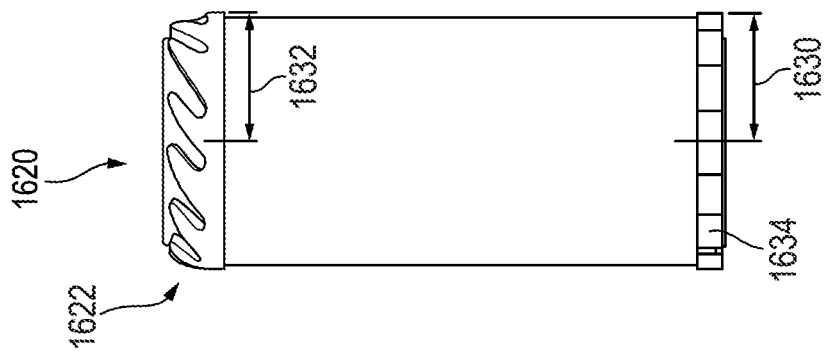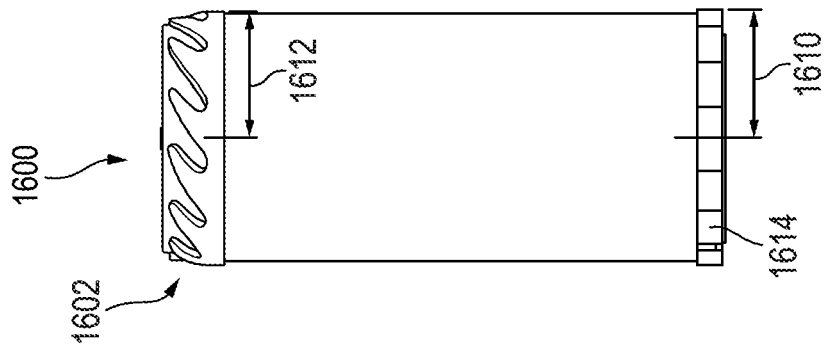

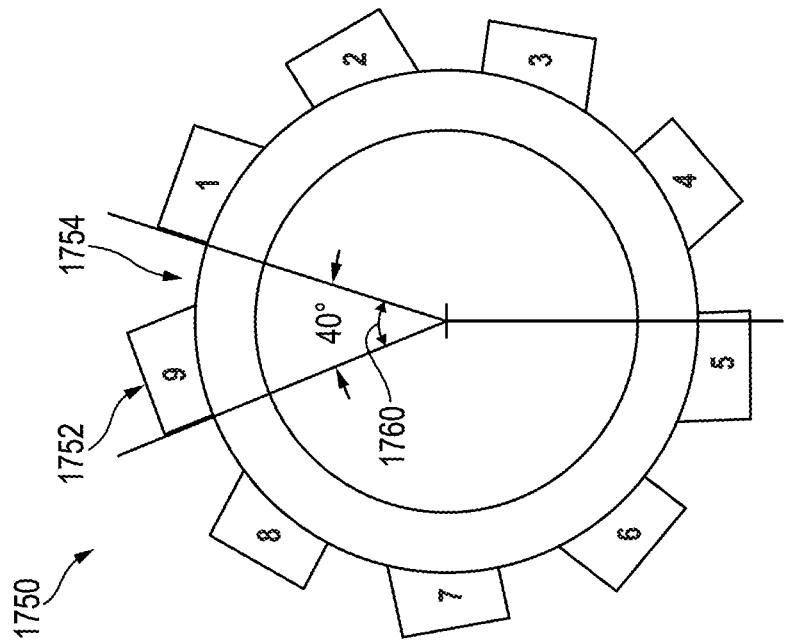
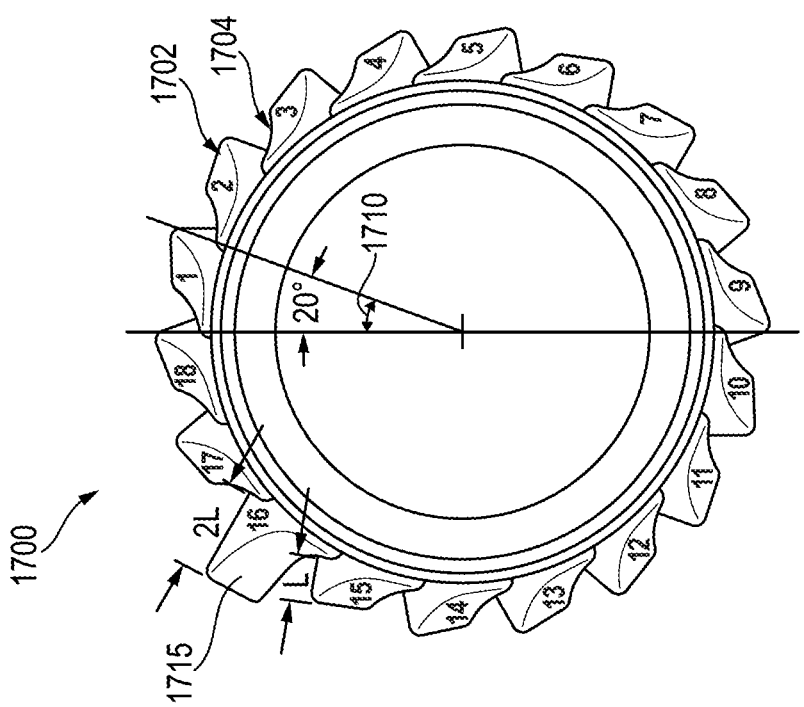

US 11,547,965 B2

CURVED LOBED SEAL LOCK AIR FILTER SYSTEM

CROSS-REFERENCE APPLICATION

The present application is a National Phase of PCT Application No. PCT/US2020/031997 filed May 8, 2020, which claims priority to U.S. Provisional Patent Application No. 62/847,682 filed May 14, 2019. The contents of these applications are incorporated herein by reference in their entirety and for all purposes.

FIELD

The present invention relates generally to air filtration systems for use with internal combustion engines or the like.

BACKGROUND

A number of conventional filtration systems make use of one or multiple seal members along the filter element. The integrity of the seal member(s) is integral to the proper functioning of the filtration system. The seal member is at risk to become compromised (e.g., becoming torn, deformed, distorted, becoming dirty, etc.) during the packaging, shipping, and installation of the filter element. In an attempt to deter filter compromise, a number of conventional filter elements may implement a cap or netting after the filter element and seal member is formed (e.g., molded).

SUMMARY

Various embodiments provide for a filter assembly. The filter assembly includes a filter housing, a filter element, and a cover. The filter housing includes a first housing end and a second housing end disposed axially away from the first housing end. The first housing end and the second housing end define an internal cavity therebetween. A first coupling member is adjacent to the first housing end. A housing seal member is formed on the second housing end and includes a first engagement portion. The filter element is disposed in the internal cavity. The filter element includes filter media with a first media end and a second media end disposed axially away from the first media end. A first endplate is disposed on the first media end. A second endplate is disposed on the second media end. A filter seal member is formed on the second endplate and includes a second engagement portion. The second engagement portion is configured to engage the first engagement portion of the housing seal member. The cover includes a first cover end and a second cover end disposed axially away from the first cover end. A second coupling member is adjacent to the second cover end. The second coupling member is configured to engage the first coupling member to couple the cover and the filter housing. An interface plate is configured to press against the filter endplate to secure the engagement of the first engagement portion and the second engagement portion.

Various other embodiments provide for a filter element. The filter element includes filter media with a first media end and a second media end disposed axially away from the first media end. A first endplate is disposed on the first media end. A filter seal member is formed on the first endplate. The filter seal member includes a first engagement portion configured to engage a second engagement portion of a filter housing when the filter element is disposed within an internal cavity of the filter housing. A second endplate is disposed on the second media end. The second endplate is configured to receive an interface plate to secure the engagement of the first engagement portion and the second engagement portion.

Various other embodiments provide for a filter housing. The filter housing comprises a first housing end and a second housing end disposed axially away from the first housing end. The first housing end and the second housing end define an internal cavity therebetween. The filter housing includes a first coupling member adjacent to the first housing end and a housing seal member formed on the second housing end. The housing seal member includes an engagement end. The engagement end includes at least one inner lobe, at least one inner guide channel, at least one outer lobe, at least one outer guide channel, and a ring cavity defined between the at least one inner lobe and the at least one outer lobe.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 5C is a cross-sectional view of the filter housing that includes a housing seal member of FIG. 5A.

FIG. 5D is a cross-sectional view of a portion of the filter housing that includes the housing seal member of FIG. 5C.

FIG. 9 is a graphical representation of spring characteristics of a biasing member in a filter assembly, according to an example embodiment.

FIGS. 16A-16D show a side view of a variety of filter elements with different filter seal members formed using a protective seal mold.

FIG. 17A shows a top view of an eighteen lobed non-parallel, curved filter seal member formed using a protective seal mold, according to another embodiment.

FIG. 17B shows a top view of a nine lobed non-parallel, curved filter seal member formed using a protective seal mold, according to yet another embodiment.

DETAILED DESCRIPTION

Figure 1:
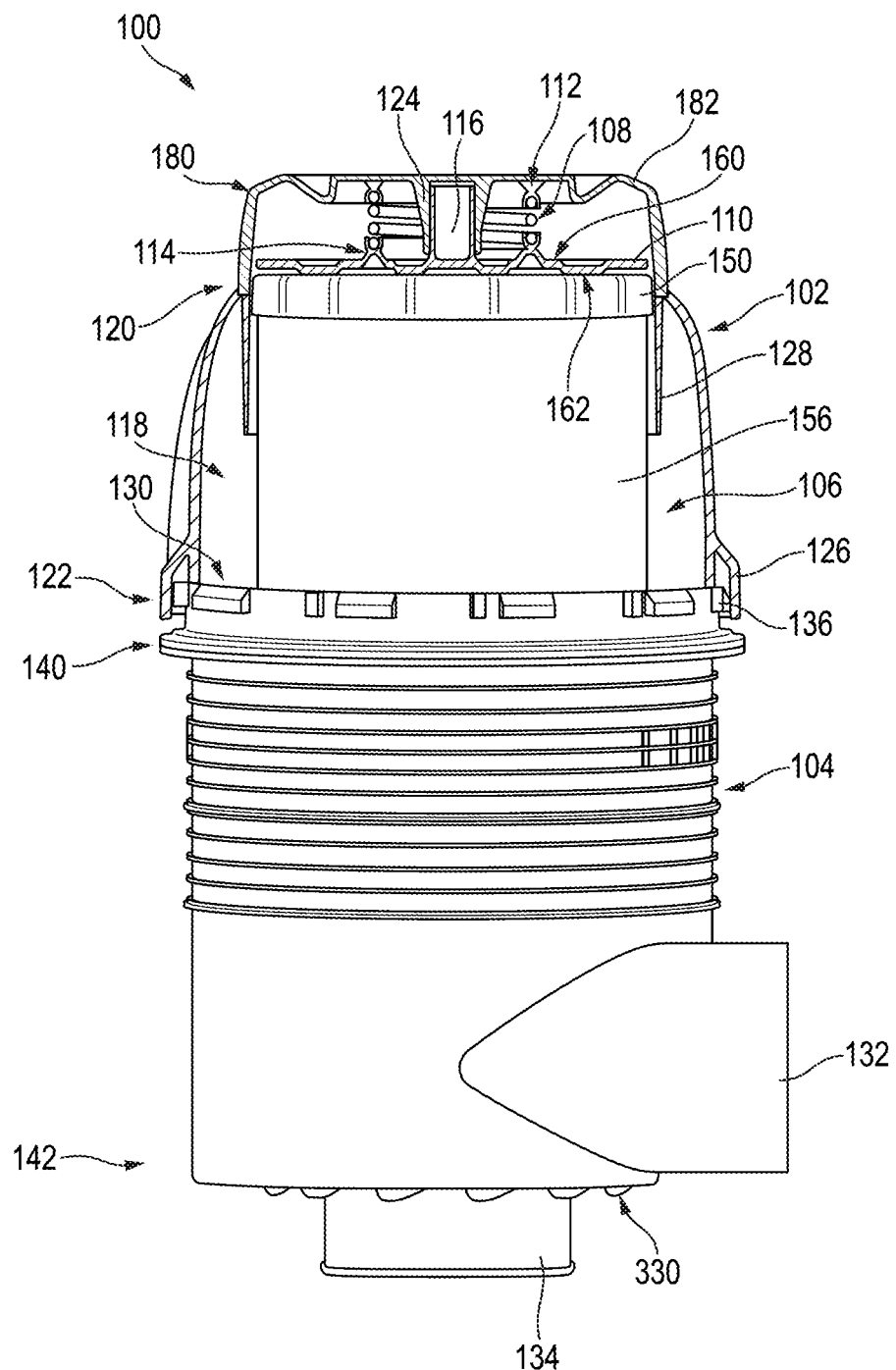
FIG. 1 is a cross-sectional side view of a filter assembly with a biasing member with an interface plate disposed in a cover, according to an example embodiment.

Referring to the figures generally, the various embodiments disclosed herein relate to a filter assembly with a cover that includes a filter seal engagement member. In some embodiments, the filter seal engagement member includes a biasing member and interface plate (e.g., seal plate, push plate, etc.) that abuts a filter element with an inner and outer seal portion configured to engage complementary portions on a filter housing. The biasing member and interface plate are configured to press against an endplate of the filter element and cause a load (e.g., force) that is sufficient to secure the filter element in place in the filter housing. In other embodiments, the filter seal formation element includes a centertube that abuts the cover and filter element and is configured to facilitate engagement of an inner and outer seal portion of the filter element and complementary portions on a filter housing. In other embodiments, the filter seal formation element includes an endcap that abuts the cover and is configured to facilitate engagement of an inner and outer seal portion of the filter element and complementary portions on a filter housing. The inner and outer seal portions of the filter element are configured to be mechanically locked into complementary undercuts in the housing when installed, thus deterring sag of the filter element. In some embodiments, the inner and outer seal portion of the filter element comprise plastic rings. Accordingly, the filter seal engagement member (e.g., biasing member and the interface plate, centertube, endcap, etc.) provide stability and a "sealing force" (e.g., a load sufficient to form a seal between two members) for the filter element and filter housing during severe vibration and movement (e.g., dynamic). Specifically, the filter seal engagement member are configured to act upon the filter element to provide a load in the axial direction (e.g., in the direction of the filter housing complementary engagement portion) that assists securing the filter element into the corresponding undercuts of the filter housing such that the seal remains formed during combined twisting and translating entrapment of the filter element between the filter housing and a cover. In some embodiments, the cover is a first portion of a filter housing with the complementary sealing portions disposed on an opposite end of the filter housing.

The inner and outer seal portions of the filter element and complementary sealing portion of the filter housing may be configured to form a wide variety of filter seal member shapes and configurations. The filter seal member may be configured to be mechanically lock into complementary undercuts of a housing and may secure the filter element in place during vibrations and/or movement of the filter element, filter housing, or the filter assembly. The formed filter seal may be a curved filter seal, a non-parallel curved seal, a helical curved filter seal, a parallel filter seal, or other similarly configured filter seals. In some embodiments, the formed filter seal may comprise a pattern of curved parallel lobes around an outer surface of the filter seal member, which provides for greater surface area for retaining the filter element within a housing, compared to non-lobed filter elements. The formed filter seal may be formed on a single end of the filter end or may be disposed on both filter ends. In some embodiments, the inner and outer seal portions of the filter element and complementary sealing portion of the filter housing may be configured to form a robust twist lock filter seal member that provides for a rotational (e.g., twisting) and translational installation method of the filter element into a filter housing, such that a seal is formed between the housing and filter element. The filter element described below may be installed into a filter assembly, such as an air filter assembly, that includes a filter housing, a filter cover, and a filter element.

The curved filter seal member according to various embodiments includes a plurality of lobes and channels and a centrally located support ring that are configured to rotate and translate into a complementary plurality of lobes and channels and a centrally located ring cavity. A filter seal engagement member, for example, a biasing member and interface plate, may provide a load on an end of the filter element that, along with the interlocked channels and ring portions, "lock" the filter element into the filter housing as it takes both translation along the central axis and rotation relative to the seal member's seal regions (e.g., seal zone) to cause the filter element to move away from the sealing regions within the housing under normal and severe vibration conditions. In embodiments where the filter element is remote-mounted or vibration-isolated, the filter element may be locked within the housing as a result of the complementary interlocked channels and ring portions. In some embodiments, the curved filter seal member secures the filter element between the cover and housing by utilizing a urethane end cap that is sufficiently thick. In such embodiments, the filtration system with the cover may not include a biasing member nor an interface plate. In those embodiments, a "soft" sealing member is disposed within the cover, such that the cover maintains the gasket seal between the filter element and housing.

Referring to FIGS. 1-4B, a filter assembly 100 that includes a biasing member 108 and interface plate 110 that abuts a filter element 106 with a filter seal member 152 configured to engage a complementary housing seal member 252 formed in a filter housing 104 is shown, according to an example embodiment. The filter assembly 100 includes a cover 102, a filter housing 104, a filter element 106 disposed between the cover 102 and the filter housing 104, a biasing member 108, and an interface plate 110, which are both disposed adjacent the cover end of the filter assembly 100. The filter housing 104 includes an inlet 132 and an outlet 134. As shown in FIGS. 1-4B, a portion of the filter element 106 is disposed in an internal cover cavity 118 of the cover 102 and another portion of the filter element 106 is disposed within an internal housing cavity 130 of the filter housing 104. In some embodiments, the interface plate 110 and biasing member 108 are integrally formed as a biasing plate.

The cover 102 includes a first cover end 120 and a second cover end 122, which cooperate to define an internal cover cavity 118. The second cover end 122 includes a cover coupling member 126 that is configured to engage a complementary housing coupling member 136 on the filter housing 104. The cover coupling member 126 may be a rotational coupling member that forms a cavity configured to receive a protruding coupling member in rotational manner that couples (e.g., locks) the cover 102 to the filter housing 104. A biasing member portion 180 extends from the first cover end 120 in a direction away from the second cover end 122 toward an end portion 182. As shown in the cross-sectional view of the cover 102 in FIG. 1, the biasing member portion 180 is formed as a single unit with the cover 102. The biasing member portion 180 includes a guidance channel 124 and a filter element guidance channel 128 that are configured to provide installation guidance and support for the interface plate 110 and filter element 106, respectively.

The guidance channel 124 is substantially centrally located and is configured to receive a complementary guidance element 116 on the interface plate 110 to guide the interface plate 110 and/or biasing member 108 to the proper installation location. The filter element guidance channel 128 is disposed around the end of the biasing member portion 180 and extends axially toward the filter housing 104. In some embodiments, the filter element guidance channel 128 extends from the first cover end 120 toward the filter housing 104 for a distance that is at least one-third the length of the cover 102 (e.g., from the first cover end 120 to the second cover end 122). The filter element guidance channel 128 is configured to receive an end of the filter endplate 150 of the filter element 106. In some embodiments, the filter element guidance channel 128 extends past the endplate 150 and is adjacent to a portion of the filter media 156. In some embodiments, the filter element guidance channel 128 and the filter endplate 150 engage to form a fluidly-tight seal to prevent fluid from entering the biasing member portion 180. In some embodiments, the filter element guidance channel 128 and the filter endplate 150 engage to form a seal to prevent contaminants (e.g., stones, insects, and other forms of debris) from entering the biasing member portion 180.

The biasing member 108 and the interface plate 110 are disposed within an internal volume formed within the biasing member portion 180. In some embodiments, the biasing member 108 is a spring that has a specific elasticity and exerts a range of biasing forces. The biasing member 108 is coupled to a surface of the end portion 182 by a first coupling member 112. As shown in FIG. 1, the first coupling member 112 is disposed outside and around the guidance channel 124 that extends from the end portion 182. In some embodiments, the first coupling member 112 is a biasing member channel configured to receive an end of the biasing member 108. The biasing member 108 is coupled to a first plate end 160 by a second coupling member 114. As shown in FIG. 1, the second coupling member 114 is disposed outside and around the guidance element 116 that extends from the first plate end 160. In some embodiments, the second coupling member 114 is a biasing member channel configured to receive an end of the biasing member. A second plate end 162 is disposed axially away from the first plate end 160 and is configured to abut the endplate 150 of the filter element to exert the load (e.g., spring force) of the biasing member 108 onto the filter element 106 and filter housing 104.

Figure 2A:
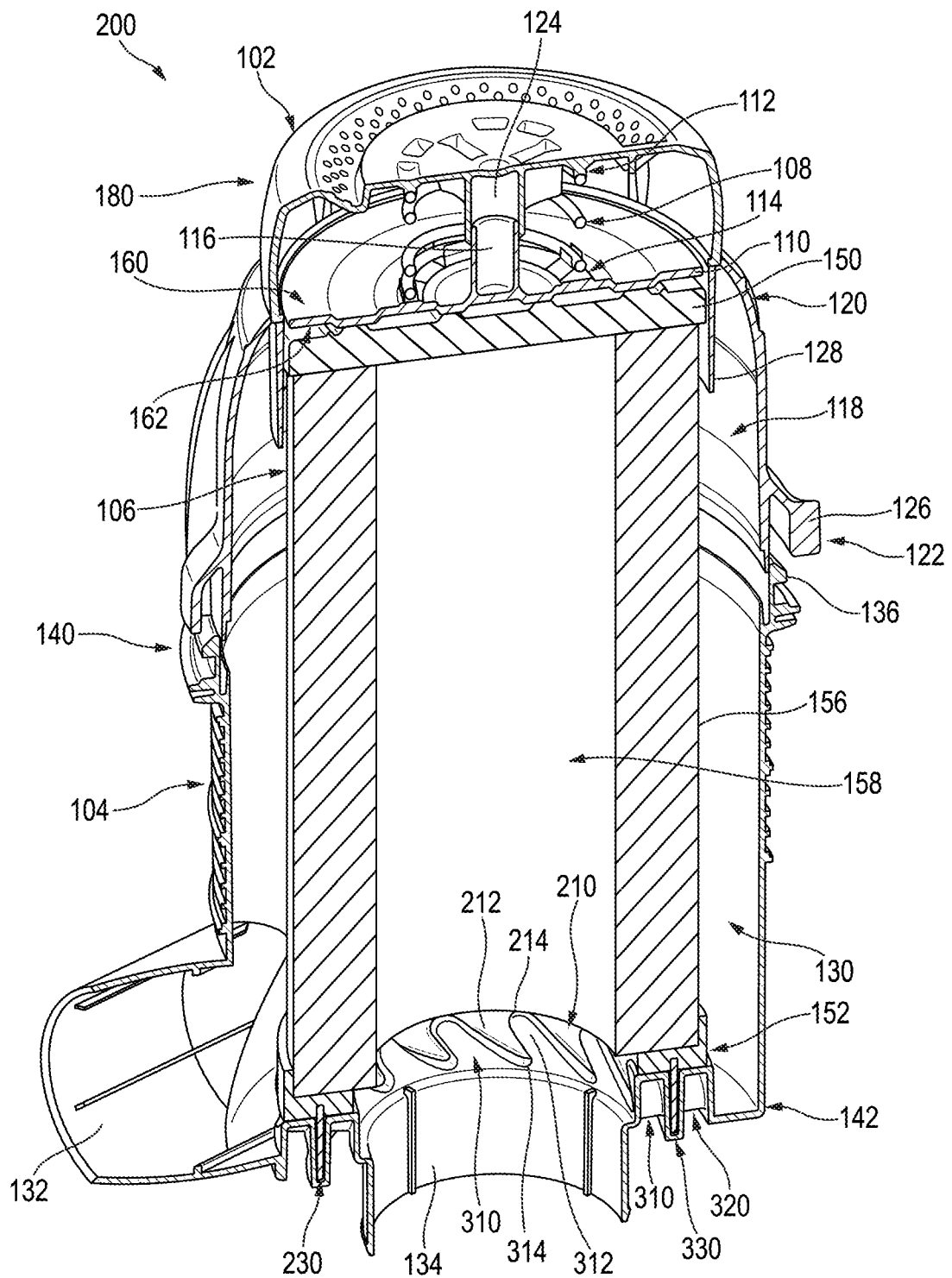
FIG. 2A is a cross-sectional perspective view of the filter assembly with the biasing member of FIG. 1.
Figure 2B:
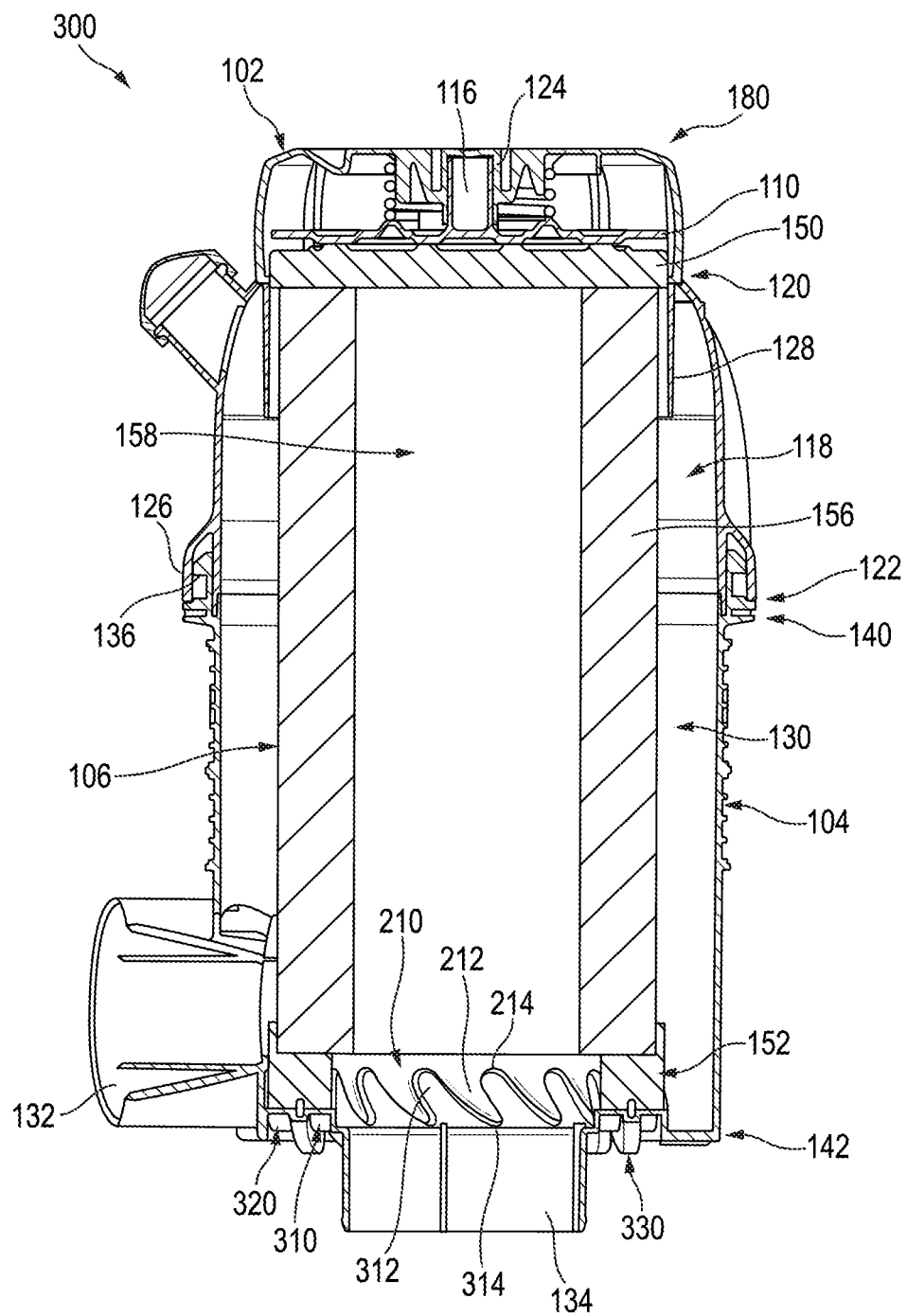
FIG. 2B is a cross-sectional side view of the filter assembly with the biasing member of FIG. 2A.

Referring to FIGS. 2A & 2B, cross-sectional view of the filter assembly 100 in an open configuration 200 (e.g., cover 102 and filter housing 104 are not coupled) and a closed configuration 300 (e.g., cover 102 and filter housing 104 are coupled) are shown, according to an example embodiment. The filter element 106 includes the filter endplate 150, a filter seal member 152 disposed axially away from the filter endplate 150, and filter media 156 disposed between the filter endplate 150 and the filter seal member 152. The filter media 156 defines an internal filter media cavity 158. Although the filter media 156 is shown arranged as a cylindrical filter block having a circular cross-sectional shape, the filter media 156 can be arranged in other shapes (e.g., racetrack or oval shapes). The filter media 156 may comprise, for example, pleated filter media arranged in a panel or pleat block, or corrugated filter media that is arranged in a panel, a block, a cylinder, a racetrack, or other arrangements.

In one set of embodiments, the filter media 156 is generally formed by a flat sheet of filter media 156 and a formed sheet of filter media 156. The formed sheet includes a plurality of crests formed by curves and/or pleats in the sheet. The plurality of crests form tetrahedron channels between the formed sheet and the flat sheet. In some embodiments, embossments, such as dimples, are provided on the crests formed by the curves and/or pleats. The embossments help to maintain spacing between adjacent layers of the filter media (i.e., between the formed sheet and the flat sheet), thereby increasing dust holding capacity and lowering pressure drop over similarly configured filter media not having the embossments. In some arrangements, the filter media 156 is pleated along a plurality of bend lines. The bend lines extend axially along an axial direction and include a first set of bend lines extending from the upstream inlet axially towards the downstream outlet, and a second set of bend lines extending from the downstream outlet axially towards the upstream inlet.

In some arrangements, the filter media 156 includes a plurality of inlet tetrahedron flow channels and a plurality of outlet tetrahedron flow channels. The inlet tetrahedron merge in a central portion of the filter material, thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920. In an alternate arrangement, the flow channels comprise flutes that are alternately sealed at the upstream and downstream ends.

The filter element 106 may be substantially rigid such that the shape of the filter element 106 is substantially maintained during installation and use. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

Figure 3A:
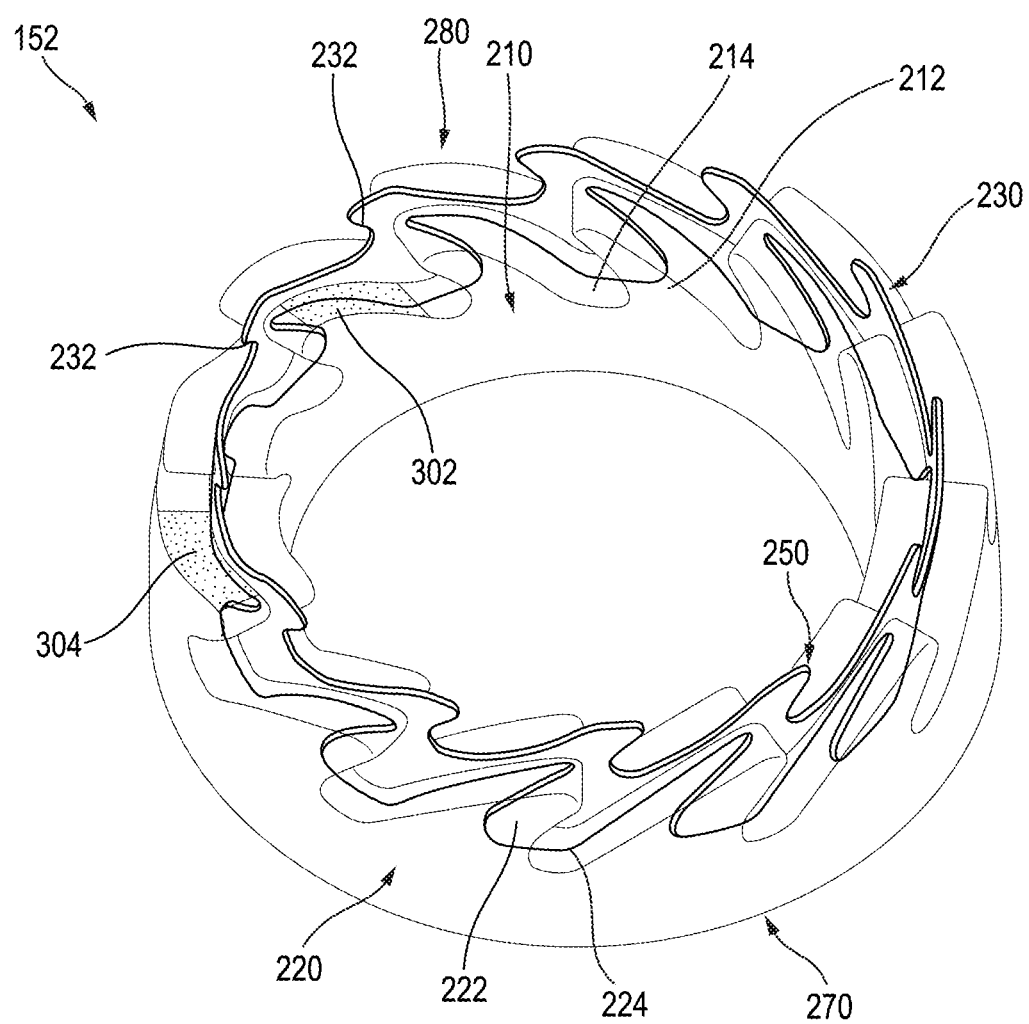
FIG. 3A is a perspective view of the filter seal member, according to an example embodiment.
Figure 7A:
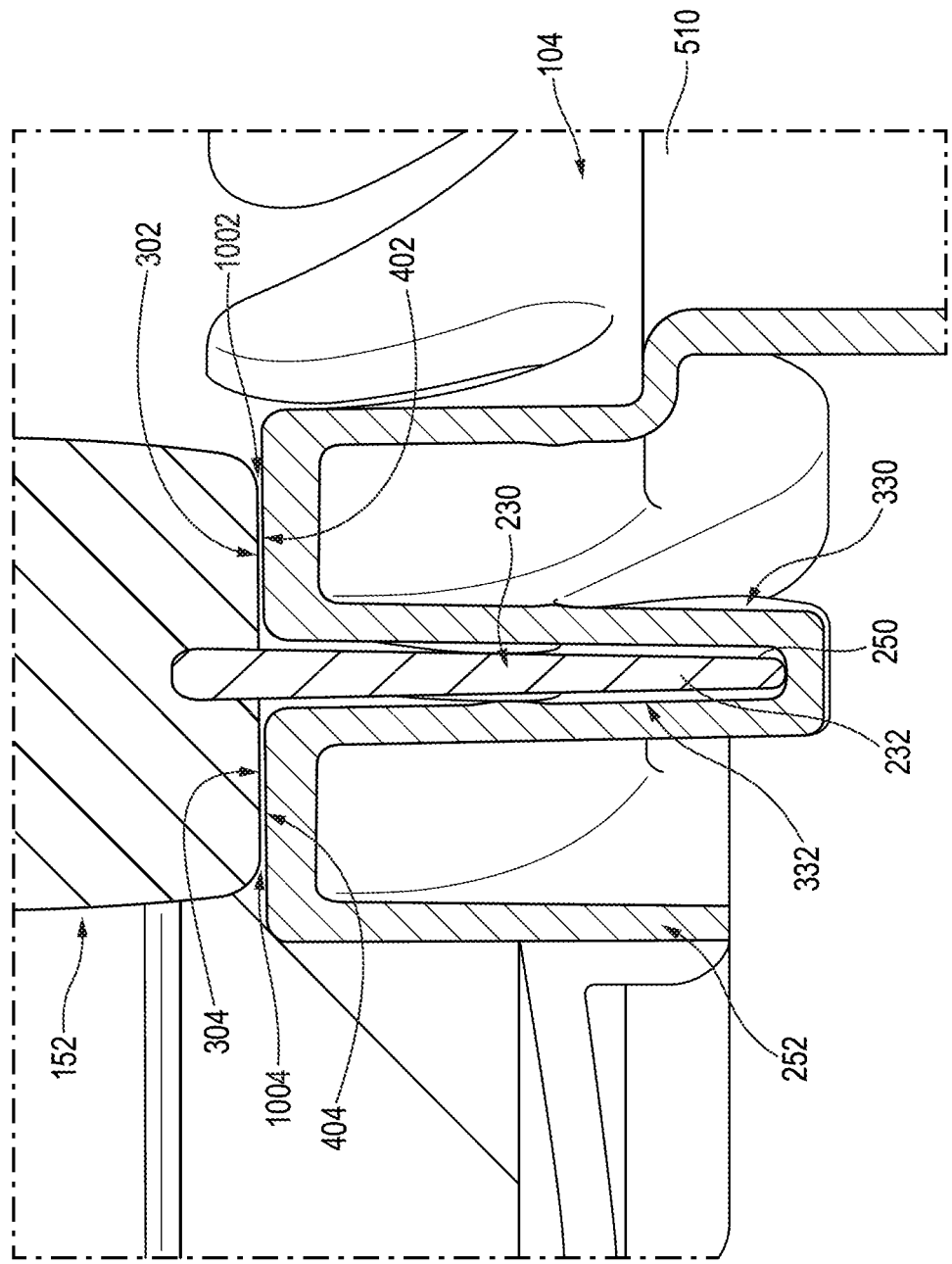
FIG. 7A is a cross-sectional side view of the engagement of the filter seal member and the housing seal member of FIG. 6A.
Figure 7B:
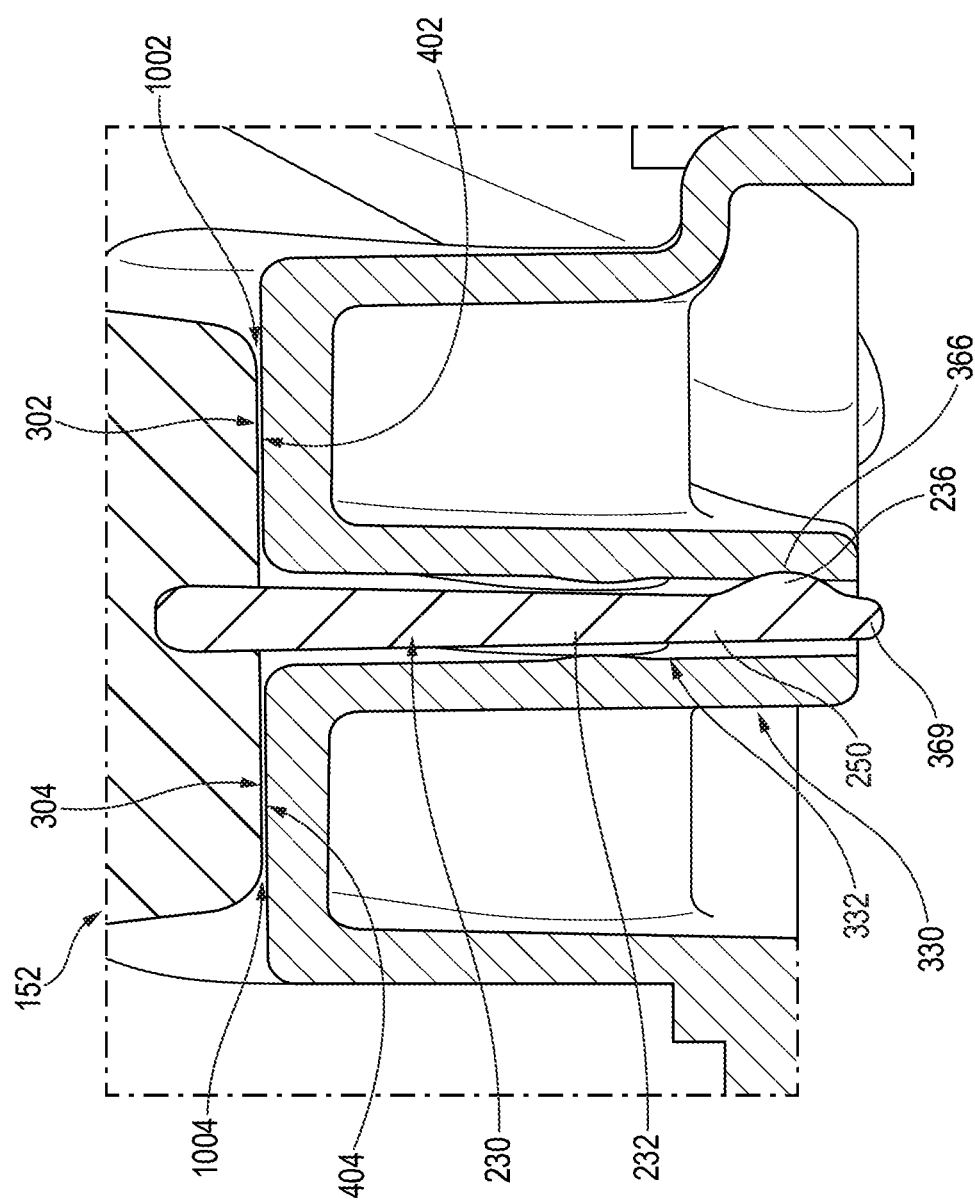
FIG. 7B is a cross-sectional side view of the engagement of the filter seal member and the housing seal member according to another example embodiment.
Figure 7D:
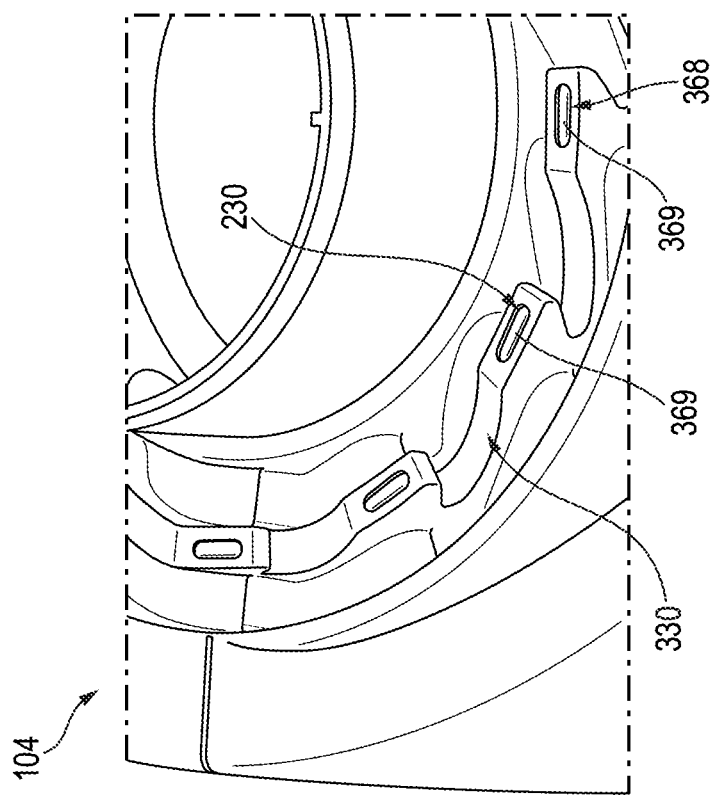
FIG. 7D is a detailed bottom perspective view of the filter housing of FIG. 7C with the filter seal member of FIG. 3C.

Referring to FIG. 3A, the filter seal member 152 includes a filter end 270 and a first engagement end 280 disposed axially away from the filter end 270. The filter end 270 includes a surface configured to receive an end of the filter media 156. The first engagement end 280 is configured to engage with a complementary housing element to couple the filter element 106 and the filter housing 104. The first engagement end 280 includes an inner filter portion 210, an outer filter portion 220, and a support ring 230. The support ring 230 separates the filter seal member 152 into the inner filter portion 210 and the outer filter portion 220 such that the support ring 230 is formed within the filter seal member 152. The inner filter portion 210 is configured to engage a complementary inner housing portion 310 to form an inner seal 1002, as shown in FIG. 7A and FIG. 7B. The inner filter portion 210 includes an inner plurality of lobes 212 and an inner plurality of guide channels 214 such that a guide channel in the plurality of guide channels 214 is disposed between a pair of lobes in the inner plurality of lobes 212. The inner plurality of lobes 212 and the inner plurality of guide channels 214 are configured to engage similar features on an inner surface of an end of a filter housing to form an inner seal when installed within the complementary filter housing 104. In other words, the inner plurality of guide channels 214 include an inner sealing portion 302, in the form of toroidal serpentine (e.g., a curved "donut ring" with lobes), that engages a complementary inner sealing portion 402 on an inner plurality of guide channels 314 on the housing seal member 252. In some embodiments, the sealing surface may be along substantially all of the surface of the first engagement end 280.

The outer filter portion 220 is configured to engage a complementary outer housing portion 320 to form an outer seal 1004. The outer filter portion 220 includes an outer plurality of lobes 222 and an outer plurality of guide channels 224 disposed between each lobe in the outer plurality of lobes 222. The outer plurality of lobes 222 and the outer plurality of guide channels 224 are configured to engage similar features on an external surface of an end of the filter housing 104 to form an external seal when the filter element 106 is installed within the complementary filter housing 104. In other words, the outer plurality of guide channels 224 include an outer sealing portion 304, in the form of toroidal serpentine (e.g., curved donut ring with lobes), that engages a complementary outer sealing portion 404 on an outer plurality of guide channels 324 on the housing seal member 252. While the inner plurality of lobes 212 are shown as having an identical size and shape to the outer plurality of lobes 222, in some embodiments, the inner plurality of lobes 212 have different shapes, sizes, and/or configurations compared to the outer plurality of lobes 222. The plurality of lobes may be configured to have a wide range of lobes with various periodicity angles and non-parallel curved shapes. In some embodiments, the plurality of lobes may be parallel shapes.

Figure 3B:
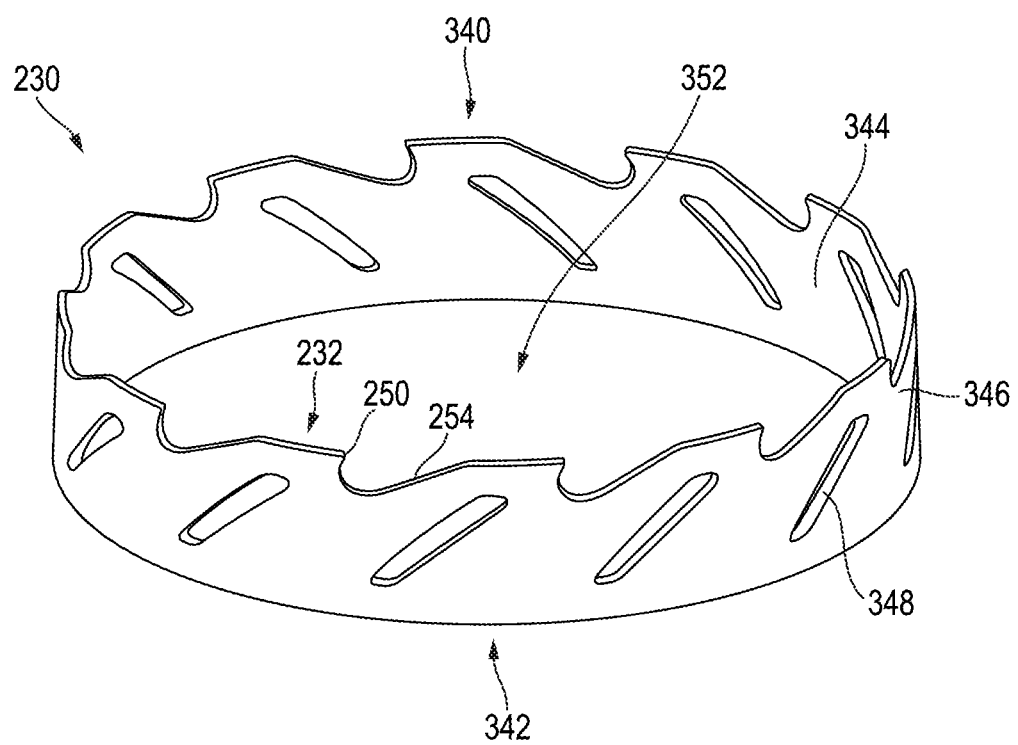
FIG. 3B is a perspective view of a support ring of the filter seal member of FIG. 3A, according to an example embodiment.

The support ring 230 is integrated with the filter seal member 152 and is configured to allow for the filter element 106 to be properly aligned and locked during the installation process (e.g., form a seal) within the filter housing 104. Turning to FIG. 3B, the support ring 230 includes a first ring end 340, a second ring end 342, and a central ring opening 352. An internal ring surface 344 and an external ring surface 346 are disposed between the first ring end 340 and the second ring end 342. A plurality of ring openings 348 are formed along the internal ring surface 344 and external ring surface 346. The plurality of ring openings 348 are configured to allow for the filter seal member material (e.g., urethane foam) to form through portions of the support ring 230 and retain the support ring 230 within the filter seal member 152. The first ring end 340 includes a plurality of hook elements 232. Each hook element in the plurality of hook elements 232 includes a support surface 254 and a hook portion 250. Each support surface 254 and hook portion 250 are configured to be inserted into the ring cavity 330 of the housing seal member 252 and rotated to engage the plurality of locking pockets 332 and each pocket opening 350 in the housing seal member 252. Each hook portion 250 is disposed between a pair of support surfaces 254 in the plurality of hook elements 232, such that each hook portion 250 extends from one support surface 254 in a hook element to another support surface 254 in an adjacent hook element in the plurality of hook element 232.

Figure 5B:
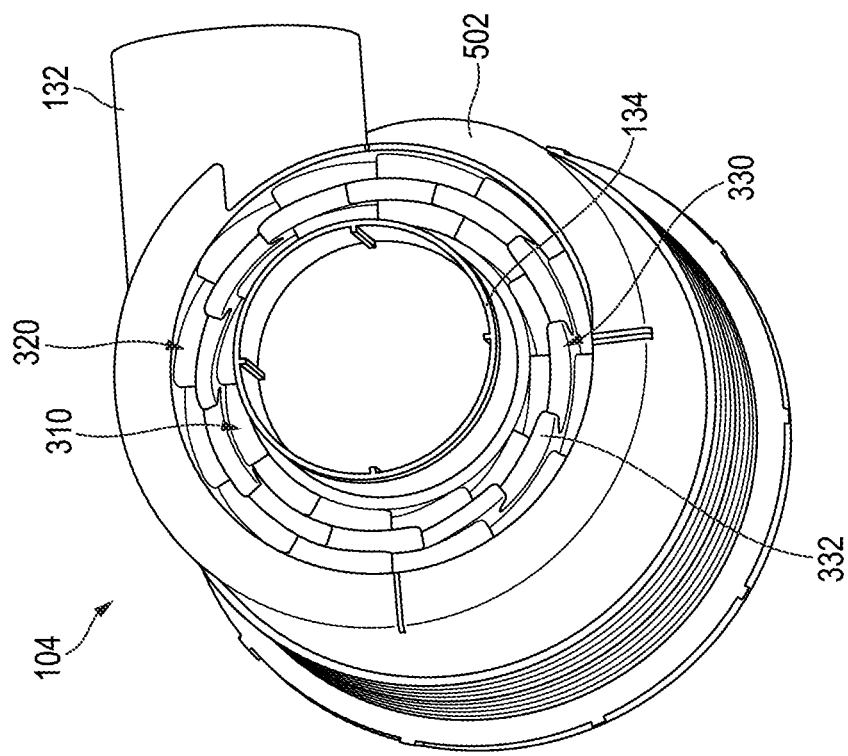
FIG. 5B is a bottom perspective view of the filter housing that includes a housing seal member of FIG. 5A.
Figure 5A:
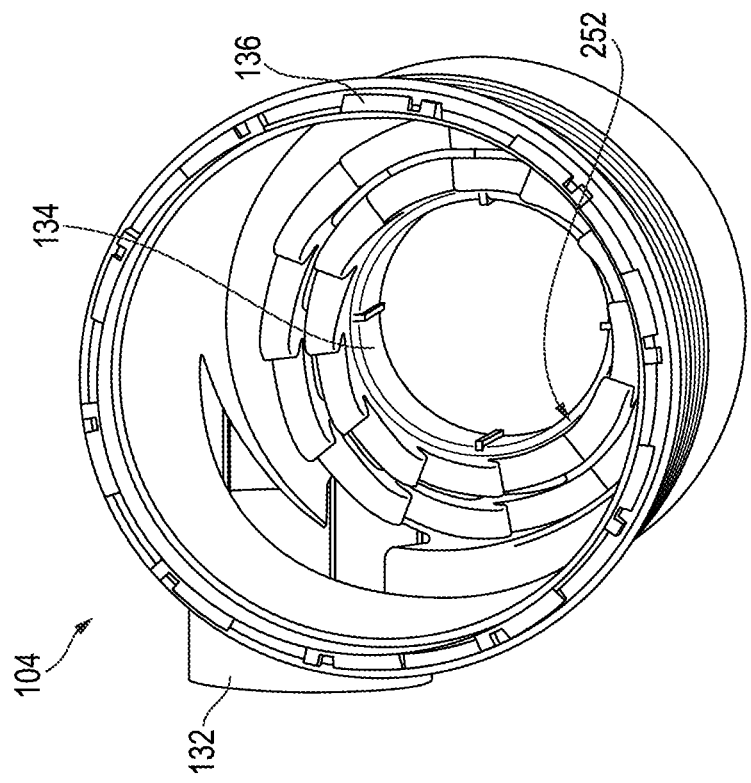
FIG. 5A is a top perspective view of a filter housing that includes a housing seal member, according to an embodiment.

The plurality of hook elements 232 are configured to be inserted into a plurality of locking pockets 332 on a second housing end 142 of the filter housing 104 and rotated to engage each hook portion 250 of each hook element in the plurality of hook elements 232 into each pocket opening 350 in the plurality of locking pockets 332, as shown in FIG. 5D, thereby "locking" the filter element 106 within the filter housing 104. In some embodiments, each hook element in the plurality of hook elements 232 possess a shape similar to a rounded "check mark" structure flipped along a horizontal axis. In some embodiments, the plurality of hook elements 232 and each hook portion 250 form a saw-toothed, dorsal-fin-shaped or similar protruding feature that provides a lead-in and guidance for engaging a housing seal member 252 of the filter housing 104 that receives the filter element 106. In some embodiments, the filter seal member 152 includes multiple curved lobes on a circular round pattern (e.g., 360 degrees on round filter) in a non-parallel configuration and includes a plastic support ring 230 that locates, stabilizes, and provides a locking feature to keep the filter element 106 from translating straight back along the central axis of filter element during sever vibration(s) while maintaining the integrity of the seal formed between the filter element 106 and filter housing 104.

Figure 3C:
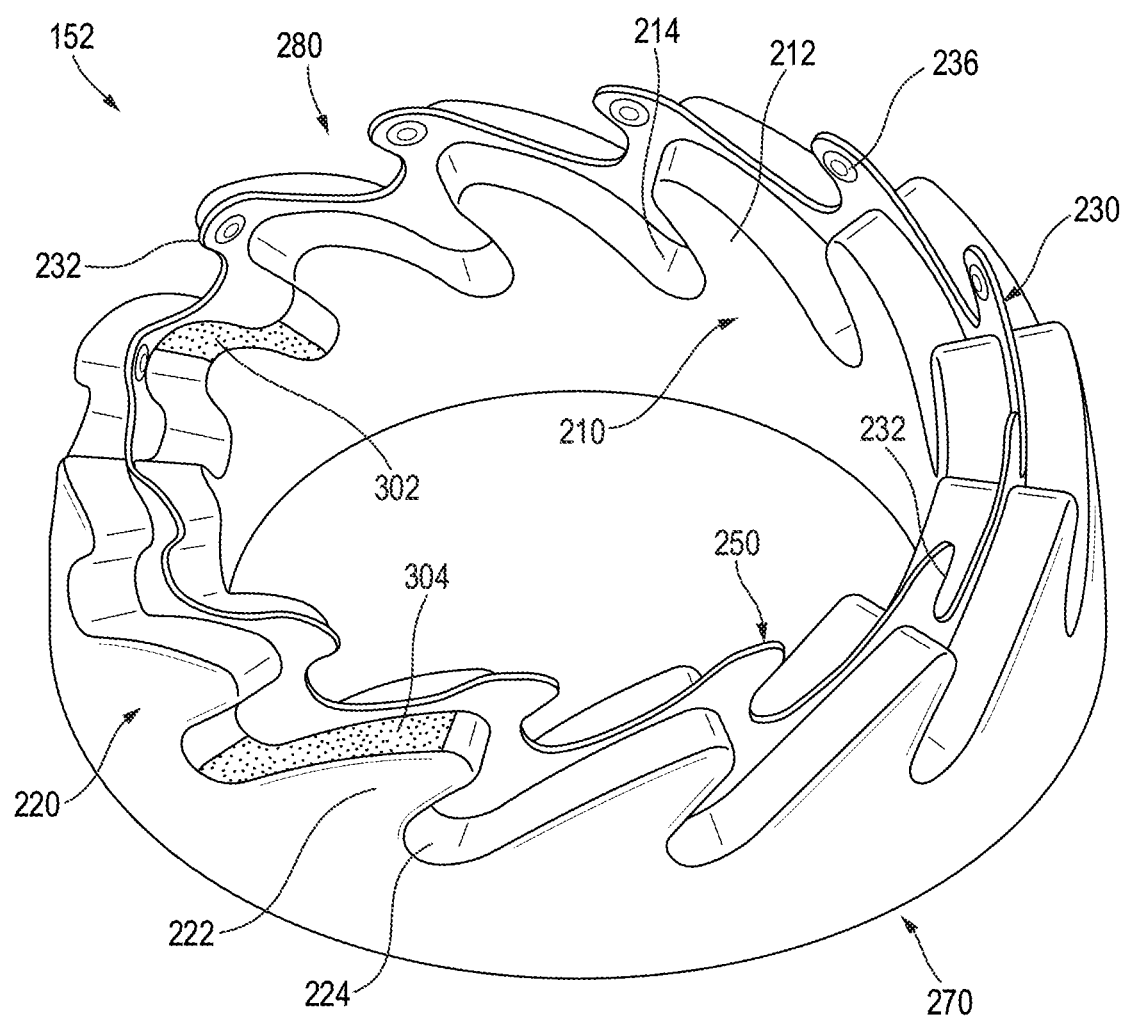
FIG. 3C is a perspective view of a filter seal member, according to another example embodiment.

In some embodiments, such as shown in FIG. 3C, the support ring 230 may include a plurality of hook projections 236 configured to engage with corresponding cavities within the filter housing 104. The plurality of hook projections 236 may extend radially away from the plurality of hook elements 232 in a direction generally toward a center (e.g., toward the inner filter portion 210) of the filter seal member 152. In some embodiments, the plurality of hook projections 236 extend radially away from the plurality of hook elements 232 in a direction generally away from the center (e.g., toward the outer filter portion 220) of the filter seal member 152. In some embodiments, each of the plurality of hook elements 232 includes one of the plurality of hook projections 236. For example, if there are 12 hook elements 232, each of the 12 hook elements 232 may include a hook projection 236 such that there are 12 hook projections 236. The plurality of hook projections 236 may be integrally formed with the support ring 230 such as by injection molding, stamping, or additive manufacturing. In some embodiments, the plurality of hook projections 236 are formed separate from the support ring 230 and later coupled to the plurality of hook elements 232.

The plurality of hook projections 236 defines a shape, shown in FIG. 3C as a spherical cap having a circular perimeter. In some embodiments, the plurality of hook projections 236 define a rectangular shape, a square shape, a frustoconical shape, or a variety of similar three-dimensional shapes. The plurality of hook projections 236 may extend from the support ring 230 a distance approximately equal to a thickness of the support ring 230. In some embodiments, the plurality of hook projections 236 extends away from the support ring 230 a distance less than a thickness of the support ring 230.

The plurality of hook projections 236 may be positioned proximate to (e.g., positioned on) the hook portion 250. For example, when the filter seal member 152 is inserted into the filter housing 104, the hook projections 236 may interface with and slide along the filter housing 104. When the filter seal member 152 is locked into the filter housing 104, the compliance of the support ring 230 may bias the plurality of hook projections 236 into the corresponding cavities within the filter housing 104. The biasing of the plurality of hook projections 236 may create a noise and/or provide tactile feedback to the installer so the installer knows that the filter seal member 152 is properly coupled to the filter housing 104. The plurality of hook projections 236 may also increase an amount of force required to disengage the filter seal member 152 from the filter housing 104, decreasing the chances that the filter seal member 152 will disengage from the filter housing 104 accidentally, such as by both sudden and prolonged vibrations.

Figure 3D:
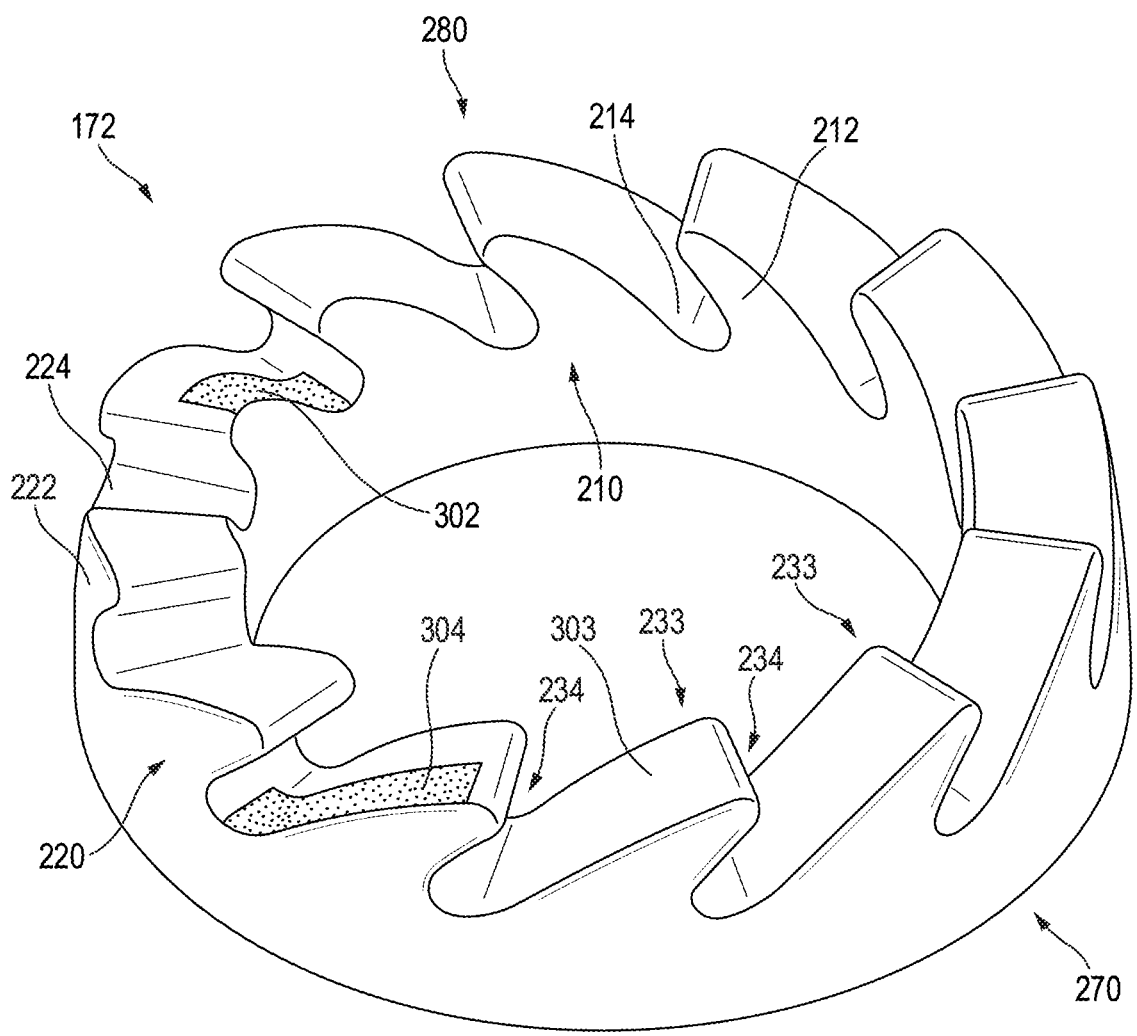
FIG. 3D is a perspective view of a filter seal member, according to yet another example embodiment.

In some embodiments, such as shown in FIG. 3D, the filter seal member 152 may be formed without the support ring 230, such as a filter seal member 172. The filter seal member 172 is similar to the filter seal member 152 of FIG. 3A and FIG. 3C. Accordingly, like numbering is used to designate like parts between the filter seal member 152 and the filter seal member 172. Referring to FIG. 3D, the filter seal member 172 includes a filter end 270 and a first engagement end 280 disposed axially away from the filter end 270. The filter end 270 includes a surface configured to receive an end of the filter media 156. The first engagement end 280 is configured to engage with a complementary housing element to couple the filter element 106 and the filter housing 104.

Similar to the filter seal member 152, the filter seal member 172 comprises an inner filter portion 210 and an outer filter portion 220. As the filter seal member 172 does not include the support ring 230, the inner filter portion 210 and the outer filter portion 220 may be contiguous and formed of a single body such that the inner plurality of lobes 212 and the outer plurality of lobes 222 form a plurality of lobes 233, and the inner plurality of guide channels 214 and the outer plurality of guide channels 224 form a plurality of guide channels 234. The plurality of lobes 233 and the plurality of guide channels 234 are configured to engage similar features on an inner surface of an end of a filter housing to form an inner seal when installed within the complementary filter housing 104. In other words, the plurality of guide channels 234 include a sealing portion 303 (e.g., the inner sealing portion 302 and the outer sealing portion 304 are contiguous, forming the sealing portion 303), in the form of toroidal serpentine (e.g., a curved "donut ring" with lobes), that engages a complementary sealing portion on an plurality of guide channels on the housing seal member 252. In some embodiments, the sealing portion 303 may be along substantially all of the surface of the first engagement end 280.

Figure 3E:
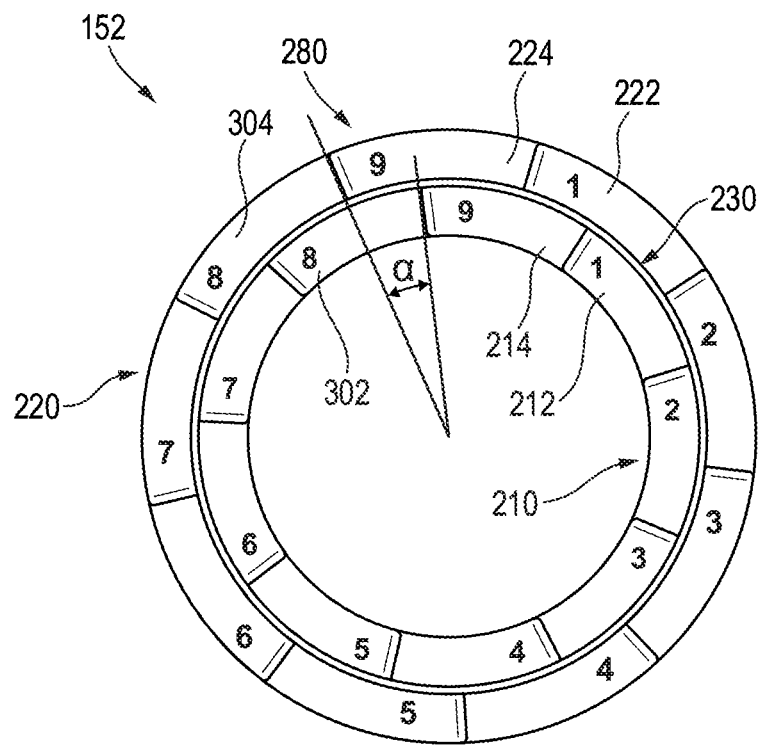
FIG. 3E is a top view of the engagement end of the filter seal member of FIG. 3A and FIG. 3C.

In some embodiments, the lobes (e.g., the inner plurality of lobes 212 and the outer plurality of lobes 222) may be shifted angularly (e.g., axially) in a prescribed angular offset relative to each other to contribute the uniqueness of filter acceptability. For example, referring to the filter seal member 152, the inner plurality of lobes 212 may be angularly shifted relative to the outer plurality of lobes 222 such that the inner plurality of lobes 212 are shifted $\alpha$-rotational degrees clockwise relative to the outer plurality of lobes 222, as shown in FIG. 3E. In the embodiment shown in FIG. 3E, both the outer plurality of lobes 222 and the inner plurality of lobes 212 have an angular pitch (e.g., rotational degrees between features) of 40-rotational degrees while the inner plurality of lobes 212 is angularly offset from the outer plurality of lobes 222 by $\alpha$-rotational degrees. In the embodiment shown in FIG. 3A, both the outer plurality of lobes 222 and the inner plurality of lobes 212 have an angular pitch of 30-rotational degrees while the inner plurality of lobes 212 is angularly offset from the outer plurality of lobes 222 by 0-rotational degrees. The support ring 230 may also be angularly offset from the inner plurality of lobes 212, the outer plurality of lobes 222, or both the inner plurality of lobes 212 and the outer plurality of lobes 222. For example, as shown in the embodiment of FIG. 3E, the plurality of hook elements 232 may have an angular pitch of 40-rotational degrees, and an angular offset from the outer plurality of lobes 222 by $(\alpha+n)$-rotational degrees, where n is a real number, including 0 and $40-\alpha$, $\alpha$ and n in units of rotational degrees.

Figure 3F:
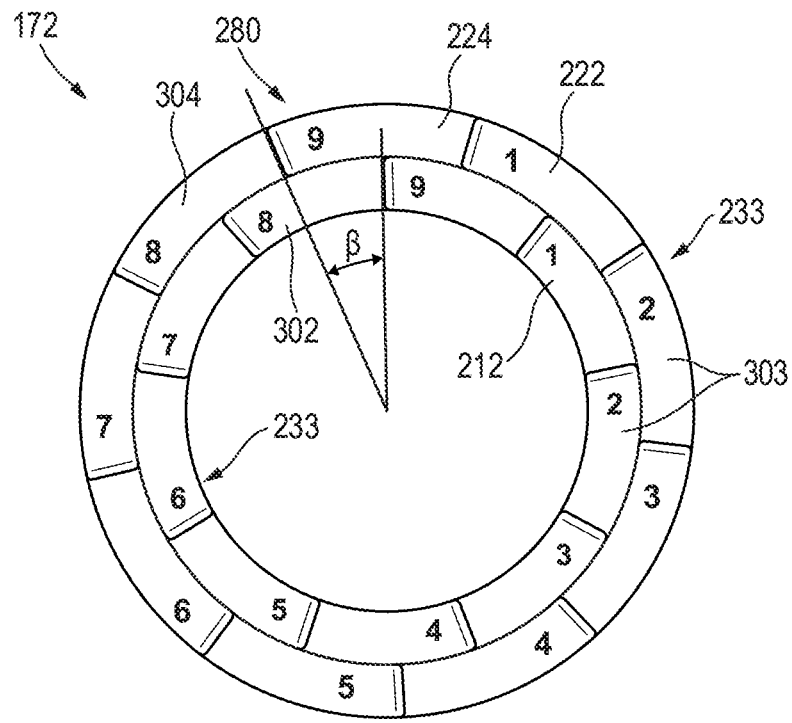
FIG. 3F is a top view of the engagement end of the filter seal member of FIG. 3D.

In some embodiments, the plurality of lobes 233 of the filter seal member 172 may be radially separated into the inner plurality of lobes 212 and the outer plurality of lobes 222 and shifted angularly (e.g., axially) relative to each other along the dotted line to contribute the uniqueness of filter acceptability. Consequently, as a result of radially separating the plurality of lobes 233, the sealing portion 303 may be radially separated to form the inner sealing portion 302 and the outer sealing portion 304. For example, as shown in FIG. 3F, the inner plurality of lobes 212 may be angularly shifted relative to the outer plurality of lobes 222 such that the inner plurality of lobes 212 are shifted $\beta$-rotational degrees clockwise relative to the outer plurality of lobes 222. In the embodiment shown in FIG. 3E, both the outer plurality of lobes 222 and the inner plurality of lobes 212 have an angular pitch (e.g., rotational degrees between features) of 40-rotational degrees while the inner plurality of lobes 212 is angularly offset from the outer plurality of lobes 222 by $\beta$-rotational degrees. In the embodiment shown in FIG. 3D, both the outer plurality of lobes 222 and the inner plurality of lobes 212 have an angular pitch of 30-rotational degrees, while the inner plurality of lobes 212 is angularly offset from the outer plurality of lobes 222 by 0-rotational degrees, thus forming the plurality of lobes 233 and the contiguous sealing portion 303.

Figure 4A:
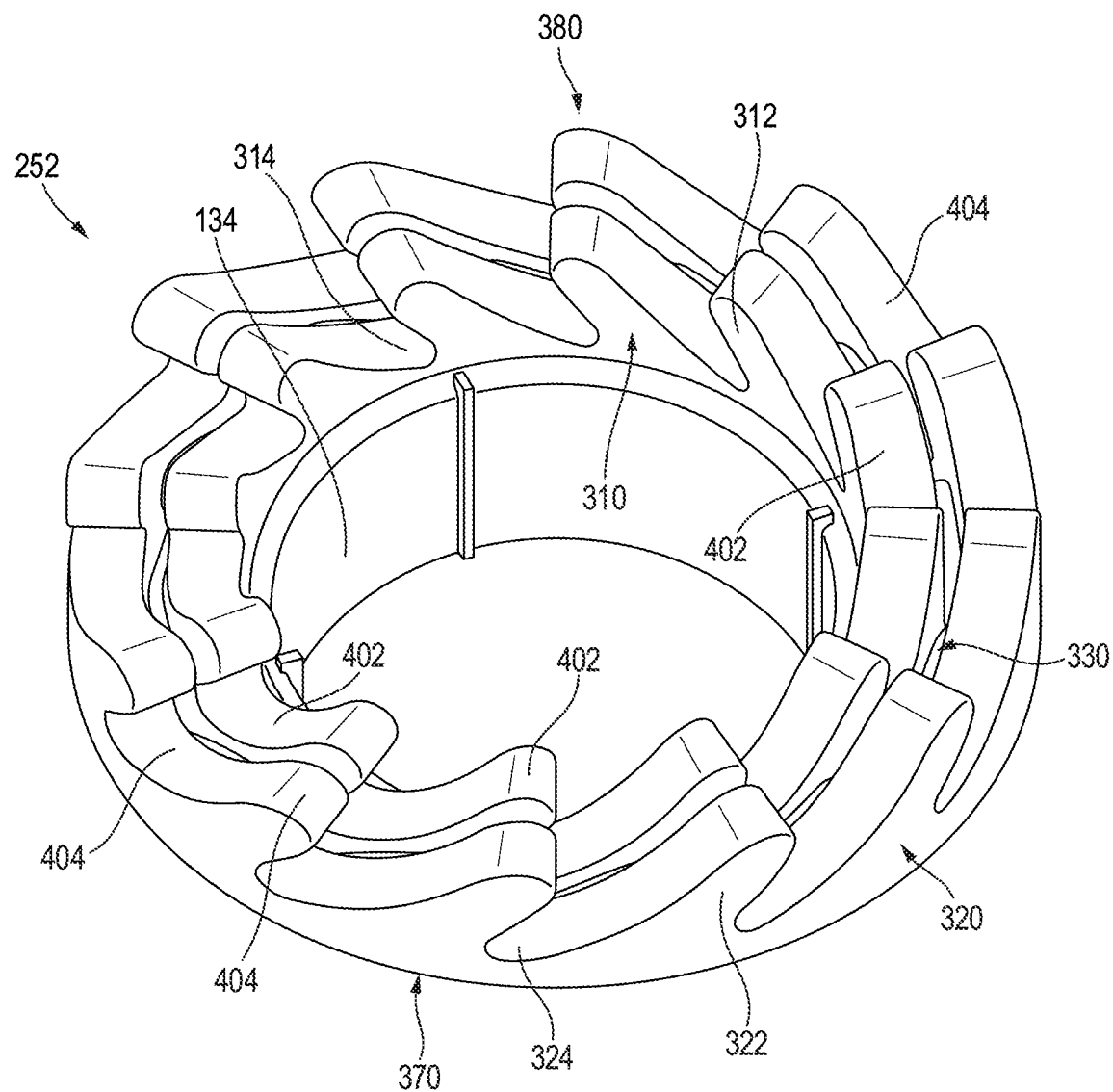
FIG. 4A is a perspective view of a housing seal member, according to an example embodiment.

Turning to FIG. 4A, a housing seal member 252 of the filter housing 104 is shown, according to an example embodiment. The housing seal member 252 is disposed adjacent the second housing end 142 and is configured to receive the filter seal member 152 in a translation and rotation engagement to couple the filter element 106 and the filter housing 104. The housing seal member 252 includes the housing seal member end 370 and a second engagement end 380 disposed axially away from the housing seal member end 370. The housing seal member end 370 is located substantially near the second housing end 142. The outlet 134 extends from an interior portion of the housing seal member end 370 in a direction away from the second engagement end 380. The second engagement end 380 is configured to engage with the complementary first engagement end 280 of the filter seal member 152 to couple the filter element 106 and the filter housing 104. The second engagement end 380 includes an inner housing portion 310, an outer housing portion 320, and a ring cavity 330.

The ring cavity 330 separates the housing seal member 252 into the inner housing portion 310 and the outer housing portion 320 such that the ring cavity 330 is formed within the housing seal member 252. The ring cavity 330 extends axially away from the second engagement end 380. The inner housing portion 310 is configured to engage a complementary inner filter portion 210 to form an inner seal 1002. The inner housing portion 310 includes an inner plurality of lobes 312 and an inner plurality of guide channels 314 disposed between each lobe in the inner plurality of lobes 312. The inner plurality of lobes 312 and the inner plurality of guide channels 314 are configured to engage complementary features on an inner surface of an end of a filter element to form an inner seal when installed within the complementary filter housing 104. In other words, the inner plurality of guide channels 314 include an inner sealing portion 402 that engages the complementary inner sealing portion 302 on the inner plurality of guide channels 214 on the filter seal member 152.

As similarly outlined above with respect to the filter seal member 152 and the filter seal member 172, the inner housing portion 310 and the outer housing portion 320 may be shifted angularly (e.g., axially) relative to each other to contribute the uniqueness of filter acceptability.

Figure 4B:
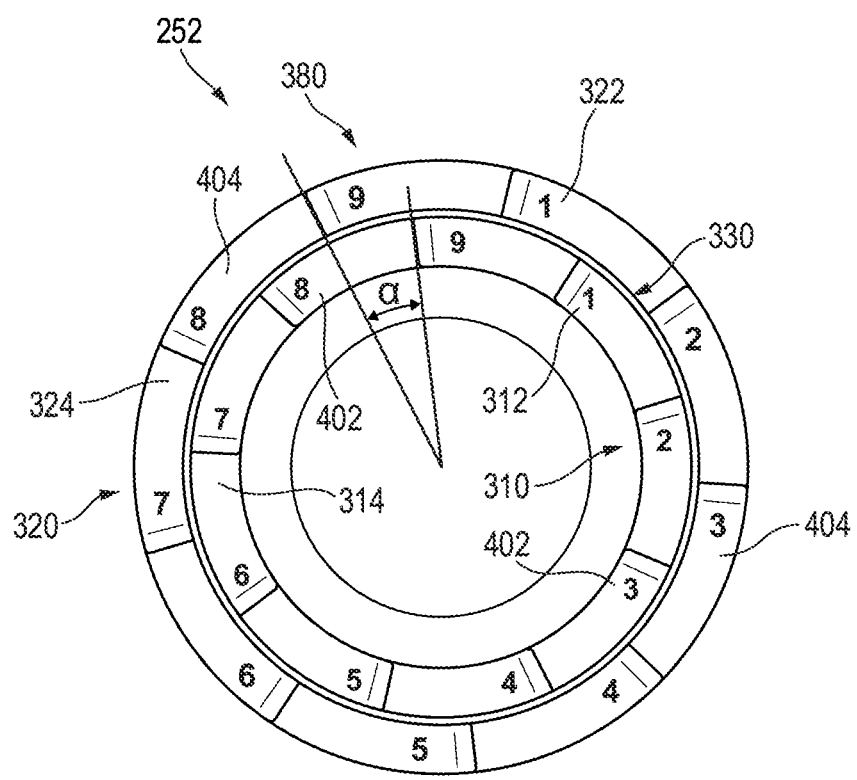
FIG. 4B is a top view of the engagement end of the housing seal member of FIG. 4A.

For example, referring to FIG. 4B, the inner plurality of lobes 312 may be angularly shifted in a prescribed angular offset relative to the outer plurality of lobes 322 such that the inner plurality of lobes 312 are shifted α-rotational degrees clockwise relative to the outer plurality of lobes 322, as shown in FIG. 4B. In the embodiment shown in FIG. 4B, both the outer plurality of lobes 322 and the inner plurality of lobes 312 have an angular pitch (e.g., rotational degrees between features) of 40-rotational degrees while the inner plurality of lobes 312 is angularly offset from the outer plurality of lobes 322 by α-rotational degrees. In the embodiment shown in FIG. 4A, both the outer plurality of lobes 322 and the inner plurality of lobes 312 have an angular pitch of 30-rotational degrees while the inner plurality of lobes 312 is angularly offset from the outer plurality of lobes 322 by 0-rotational degrees. The ring cavity 330 comprising the plurality of locking pockets 332 may also be angularly offset from the inner plurality of lobes 312, the outer plurality of lobes 322, or both. For example, as shown in the embodiment of FIG. 4B, the plurality of locking pockets 332 may have an angular pitch of 40-rotational degrees, and an angular offset from the outer plurality of lobes 322 by (α+n)-rotational degrees, where n is a real number, including 0 and 40−α, α and n in units of rotational degrees. In the embodiment shown in FIG. 4A, the plurality of locking pockets 332 may have an angular pitch of 40-rotational degrees, and an angular offset from the outer plurality of lobes 322 equal to the angular offset of the plurality of hook elements 232 of the support ring 230 relative to the outer plurality of lobes 222 shown in FIG. 3C.

The outer housing portion 320 is configured to engage a complementary outer filter portion 220 to form an outer seal 1004. The outer housing portion 320 includes an outer plurality of lobes 322 and an outer plurality of guide channels 324 disposed between each lobe in the outer plurality of lobes 322. The outer plurality of lobes 322 and the outer plurality of guide channels 324 are configured to engage similar features on an external surface of an end of a filter element to form an external seal when installed within the complementary filter housing 104. In other words, the outer plurality of guide channels 324 include an outer sealing portion 404 that engages the complementary outer sealing portion 304 on the outer plurality of guide channels 224 on the filter seal member 152. While the inner plurality of lobes 312 are shown as having an identical size and shape to the outer plurality of lobes 322, in some embodiments, the inner plurality of lobes 312 have different shapes, sizes, and/or configurations compared to the outer plurality of lobes 322. The plurality of lobes may be configured to have a wide range of lobes with various periodicity angles and non-parallel curved shapes. In some embodiments, the plurality of lobes may be parallel shapes.

In some embodiments, the second engagement end 380 may not include the ring cavity 330 such that the second engagement end 380 may form the outer seal 1004 and the inner seal 1002 with the filter seal member 172 when the second engagement end 380 is engaged with the filter seal member 172.

Turning to FIGS. 5A-5D, various views of the filter housing 104 are shown. The filter housing 104 includes a first housing end 140 and a second housing end 142 disposed axially away from the first housing end 140. The first housing end 140 includes the housing coupling member 136 disposed around an external surface and is configured to couple the cover 102 with the filter housing 104, thereby causing the biasing member 108 and interface plate 110 to press against the filter element 106 and "lock" the inner seal 1002 and outer seal 1004 formed between the filter element 106 and filter housing 104. The second housing end 142 includes the housing seal member 252 and the outlet 134. As shown in the bottom perspective view of the filter housing in FIG. 5B, the second housing end 142 includes a helical portion 502 around the housing seal member 252. In some embodiments, the second housing end 142 does not include a helical portion 502 and is substantially flat. In some embodiments, only the inner seal 1002 is formed between the filter element 106 and filter housing 104. In other embodiments, only the outer seal 1004 is formed between the filter element 106 and filter housing 104.

Referring to FIG. 5C, a cross-sectional view of the filter housing 104 is shown, the outlet 134 is formed with, and extends from, an interior portion of the housing seal member end 370 along an outlet tube portion 510. A portion 550 of the housing seal member 252 shows a detailed view of the ring cavity 330. As shown in FIG. 5D, the pocket opening 350 in a locking pocket of the plurality of locking pockets 332 is configured to receive the complementary hook portion 250 of each hook element in the plurality of hook elements 232 to, along with the axial load of the biasing member 108 and interface plate 110 on the filter endplate, "lock" the filter element 106 within the filter housing 104.

Figure 6A:
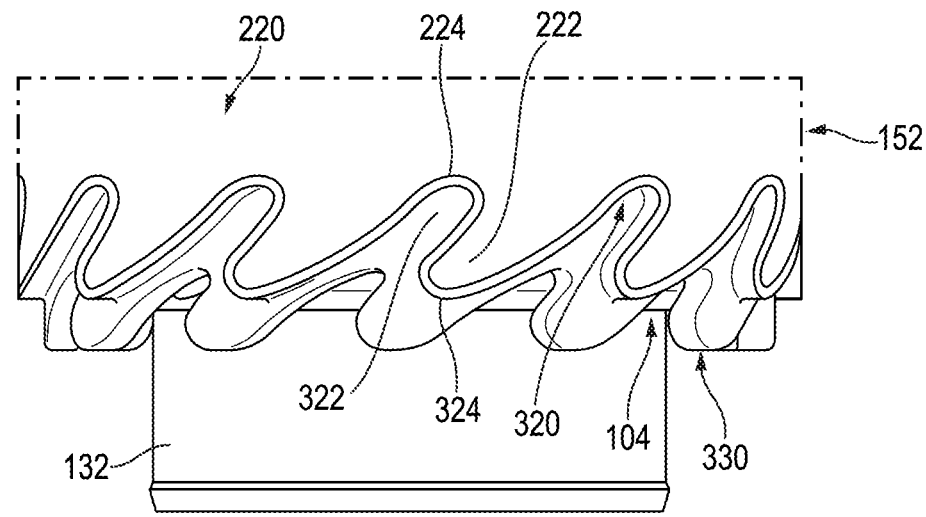
FIG. 6A is a cross-sectional view of an engagement of a filter seal member and a housing seal member, according to another example embodiment.
Figure 6B:
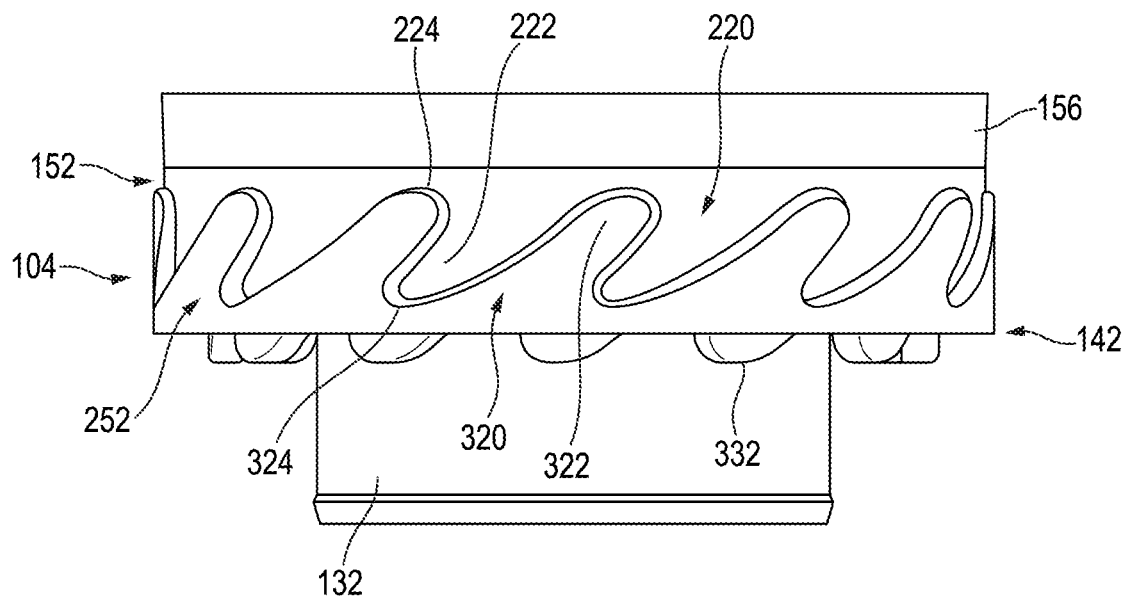
FIG. 6B is a side view of an engagement of the filter seal member and the housing seal member of FIG. 6A.

As shown in FIG. 6A, a cross-sectional view of the engagement of the outer plurality of lobes 222 of the outer filter portion 220 within the outer plurality of channels 324 of the outer housing portion 320 and of the outer plurality of lobes 322 of the outer housing portion 320 within the outer plurality of channels 224 of the outer filter portion 220. As shown in FIG. 6B, the ring cavity 330 and plurality of locking pockets 332 extend below the plane of the second housing end 142. As shown in FIG. 7A, when the filter element 106 is installed within the filter housing 104, the hook portion 250 of each hook element in the plurality of hook elements 232 engages the pocket opening 350 in a locking pocket of the plurality of locking pockets 332. The seal compression is shown between the inner sealing portion 302 of the filter seal member 152 and the inner sealing portion 402 of the housing seal member 252 that are configured to form an inner seal 1002 and the outer sealing portion 304 of the filter seal member 152 and the outer sealing portion 404 of the housing seal member 252 that are configured to form an outer seal 1004. In some embodiments, the inner sealing portion 302 of the filter seal member 152 and the inner sealing portion 402 of the housing seal member 252 are configured to receive or form an inner seal member, and the outer sealing portion 304 of the filter seal member 152 and the outer sealing portion 404 of the housing seal member 252 are configured receive or form an outer seal member.

In some embodiments, and as shown in FIG. 7B, when the filter seal member 152 is installed within the filter housing 104, the plurality of hook projections 236 disposed on the hook portion 250 of each hook element in the plurality of hook elements 232 may engage pocket cavities 366 formed within the locking pocket of the plurality of locking pockets 332, the pocket cavities 366 configured to receive the plurality of hook projections 236. As the filter seal member 152, and more specifically the support ring 230, is inserted into the plurality of locking pockets 332, the plurality of hook projections 236 may interface with and slide along the surfaces defining the plurality of locking pockets 332. When the filter seal member 152 is locked within the filter housing 104, the plurality of hook elements 232 may bias the plurality of hook projections 236 into the pocket cavities 366, creating a sound that the installer of the filter element 106 may be able to hear. The biasing of the plurality of hook projections 236 into the pocket cavities 366 may also provide tactile feedback to the installer when the filter element 106 is locked into the filter housing.

Figure 7C:
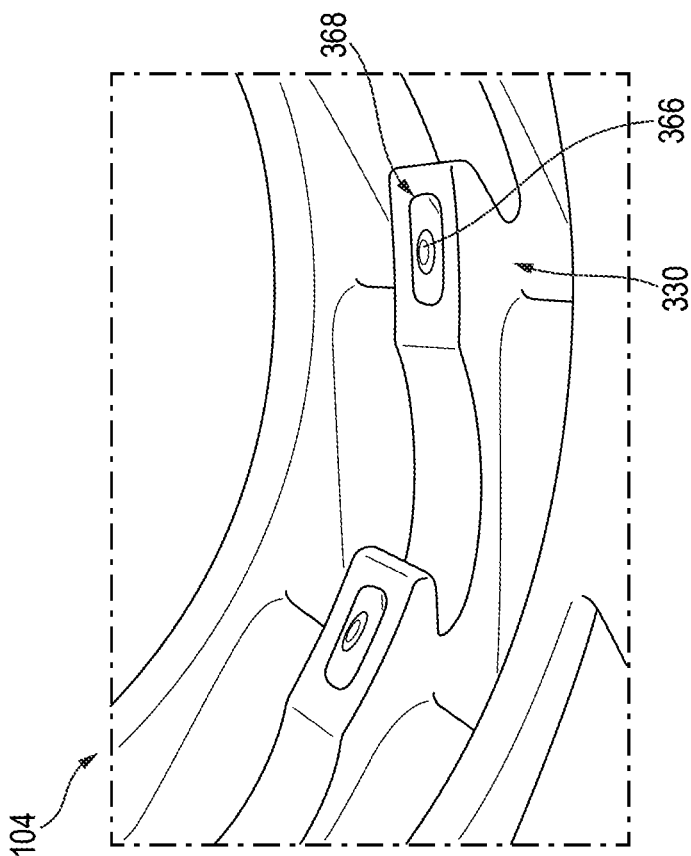
FIG. 7C is a detailed bottom perspective view of the filter housing according to another example embodiment.

In some embodiments, the plurality of hook elements 232 may extend out of the ring cavity 330 when the filter element 106, and thus the filter seal member 152, are coupled to the filter housing 104. As shown in FIG. 7C, the ring cavity 330, and more specifically a portion of the locking pocket of the plurality of locking pockets 332 positioned axially away from the inner sealing portion 402 and the outer sealing portion 404, includes a plurality of hook aperture 368 extending through the ring cavity 330 and into the filter housing 104. Each of the plurality of hook apertures 368 may be configured to receive a portion of the support ring 230, and more specifically a portion of a hook element from the plurality of hook elements 232, such that a portion of the hook element 369 may extend through the hook aperture 368 and be visible from outside of the filter housing 104 (e.g., from a side of the filter housing 104 external to the internal housing cavity 130). The plurality of hook apertures 368 may also facilitate the clearing of debris from (e.g., the cleaning of) the ring cavity 330. In some embodiments, debris may become deposited within the ring cavity 330 and interfere with the coupling between the filter element 106 and the filter housing 104. The plurality of hook apertures 368 may allow the debris to be flushed out (e.g., by water or air) through the plurality of hook apertures 368, preventing the debris from being flushed back into the internal housing cavity 130.

In some embodiments, the support ring 230 may be formed of or colored with a material being visibly distinguished from the filter housing 104 such that the portion of the hook element 369 may be visible to an installer of the filter element 106. For example, the support ring 230 may be formed of or colored with a fluorescent yellow, green, or orange. In some embodiments, the portion of the hook element 369 is formed of or colored with a phosphorescent material such that the portion of the hook element 369 is visible without an external light source and the filter element 106 may be confidently installed and inspected in low-light environments. In some embodiments, the portion of the hook element 369 may be formed of or colored with a retroreflective or reflective material such that an inspector of the filter element 106 may confirm proper locking of the filter element 106 within the filter housing 104 by shining a light (e.g., flashlight) at the filter housing 104 and see that the portion of the hook element 369 of each of the plurality of hook elements 232 is visible through the hook aperture 368 of each of the plurality of locking pockets 332. In embodiments where installation inspection is performed by cameras or image analysis, reflective and retroreflective materials may be advantageously used to form or color the portion of the hook element 369.

In some embodiments, two "inspection" features (e.g., the plurality of hook projections 236 received by the pocket cavity 366; the portion of the hook element 369 extending through the hook aperture 368 in the plurality of locking pockets 332) may be present such that the installer of the filter element 106 into the filter housing 104 may be able to hear, feel, and see that the filter element 106 is properly installed within the filter housing 104. In some embodiments, only one of the two "inspection" features may be included with the support ring 230. For example, the support ring 230 may include the plurality of hook projections 236, but the support ring 230 may not include the portion of the hook element 369 and may not extend through the hook aperture 368. In some embodiments, the filter housing 104 does not include the hook aperture 368 and the support ring 230 does not include the portion of the hook element 369.

Figure 8A:
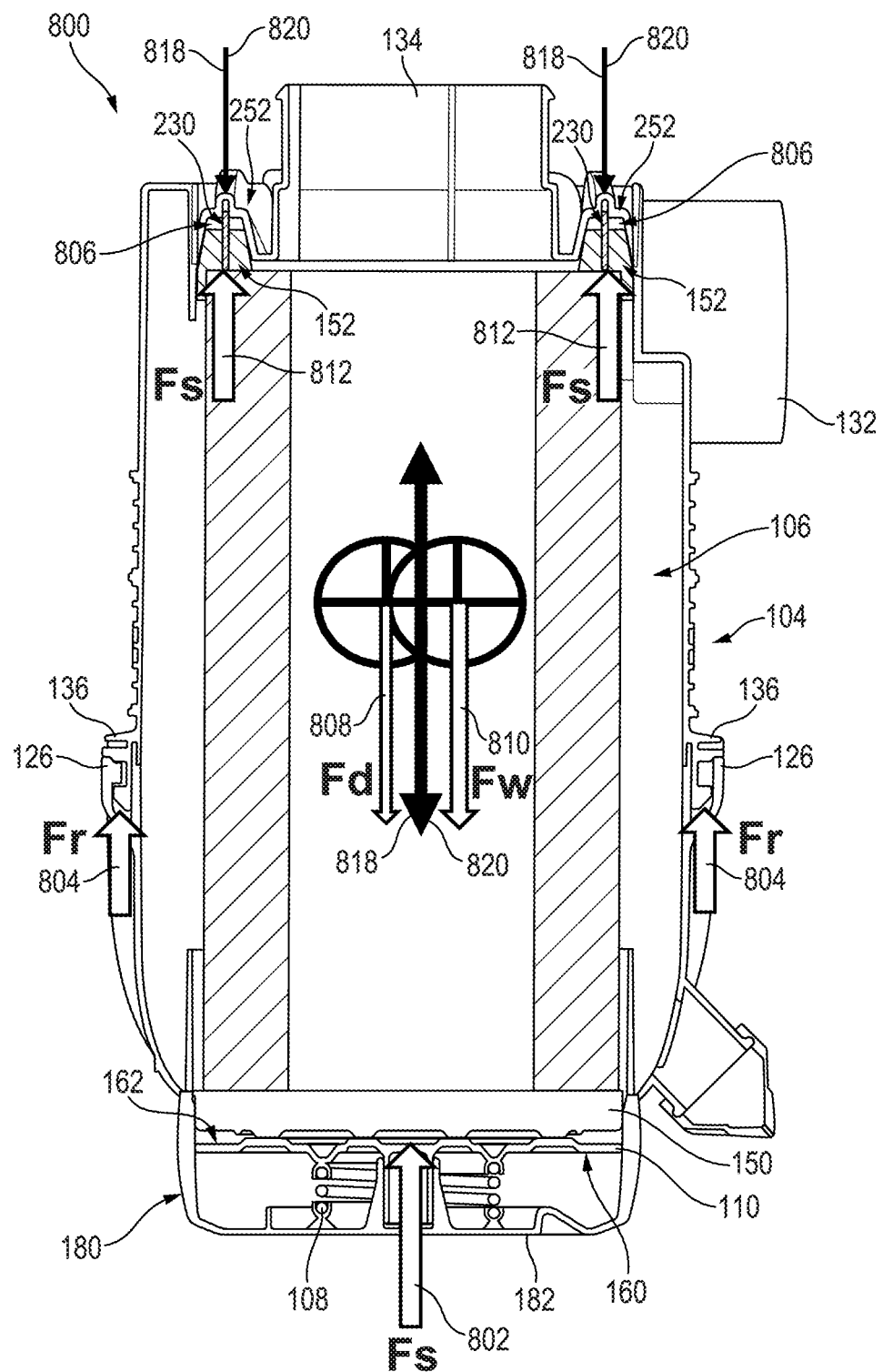
FIG. 8A is a force diagram of a filter assembly in a vertical installation position, according to an example embodiment.
Figure 8B:
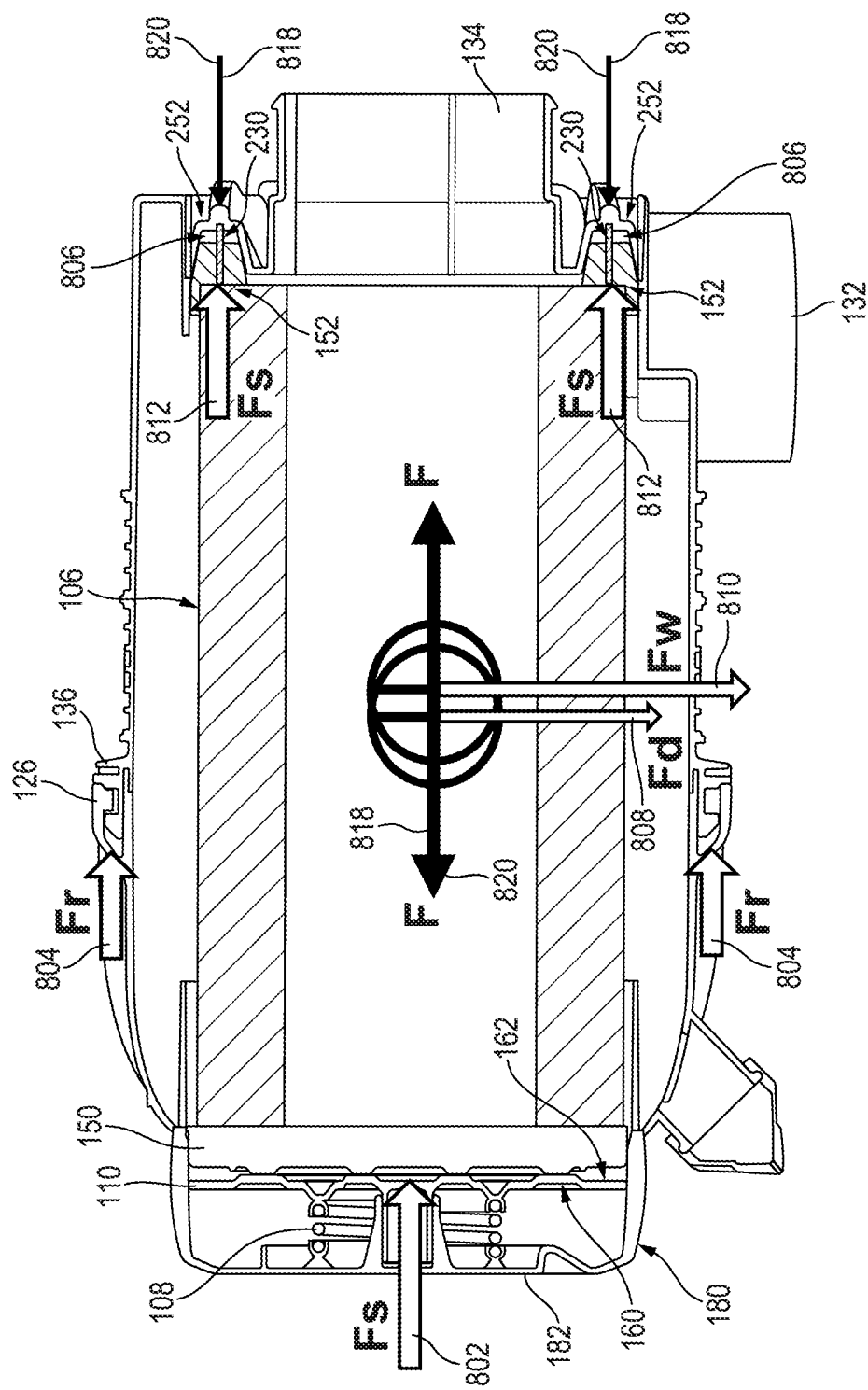
FIG. 8B is a force diagram of a filter assembly of FIG. 8A in a horizontal installation position.

A force diagram of a filter assembly 800 is shown in FIG. 8A. The filter assembly of 800 is similar to the filter assembly 100 of FIG. 1. Accordingly, like numbering is used to designate like parts between the filter assembly 800 and the filter assembly 100. The filter assembly 800 is a vertically installed filter assembly. The force of the biasing member (e.g., spring) 802 (Fs) is the spring force of the biasing member 108 being compressed between the end portion 182 and the first plate end 160 of the interface plate 110. The force of the spring 802 is provided to the filter element 106 as a result of the second plate end 162 abutting the filter endplate 150. In some embodiments, the spring force (kx) transmitted to the filter element 106 is approximately 190 Newtons (42.7 lbf). The cover retention force 804 (Fr) is the force of the coupling between the cover coupling member 126 and the housing coupling member 136. The sealing force 812 (Fs) is associated with the seal compression between the filter element 106 and the filter housing 104 as a result of the biasing member 108 acting upon the filter element 106 when the cover 102 is properly coupled to the filter housing 104. A seal compression zone 806 is formed between the filter seal member 152 and the housing seal member 252. The clean filter element 106 has a dry static force 808 (Fd). In some embodiments, the dry static force 808 is 9 Newtons (2.04 lbf). A wet filter element 106 has a wet static force 810 (Fw). In some embodiments, the wet static force 810 is 25 Newtons (5.57 lbf). Under severe vibration and oscillation, the clean filter element has a dry dynamic force 818 that works against the sealing force 812. In some embodiments, the dry dynamic force 818 is 55 Newtons (12.25 lbf). Under severe vibration and oscillation, the wet filter element has a wet dynamic force 820 that works against the sealing force 812. In some embodiments, the wet dynamic force 820 is 149 Newtons (33.43 lbf). Thus, under severe vibration and oscillation, which in some conditions is F(6 g), the sealing force 812 of 190 Newtons (42.7 lbf) is greater than the wet dynamic force 820 of 149 Newtons (33.43 lbfs) of the vibrating, wet filter element 106. Accordingly, the filter element 106 remains sealed with the filter housing 104. FIG. 8B shows a force diagram of the filter assembly 800 of FIG. 8A in a horizontal installation configuration.

FIG. 9 is a graphical representation of spring characteristics 900 of the biasing member 108, according to an example embodiment. The spring characteristics 900 are shown as a relationship between compression 902 (mm) and load 904 (N) for a first spring 910 and a second spring 912 that is shorter than the first spring 910. The first spring 910 is shown as a first linear function 914. As shown in FIG. 9, the first linear function 914 is equal to y=9.5662x−23.724 with an $R^2$ of 0.9539. The second spring 912 is shown as a second linear function 916. As shown in FIG. 9, the second linear function 916 is equal to y=9.6818x−23.833 with an $R^2$ of 0.8816.

Figure 10:
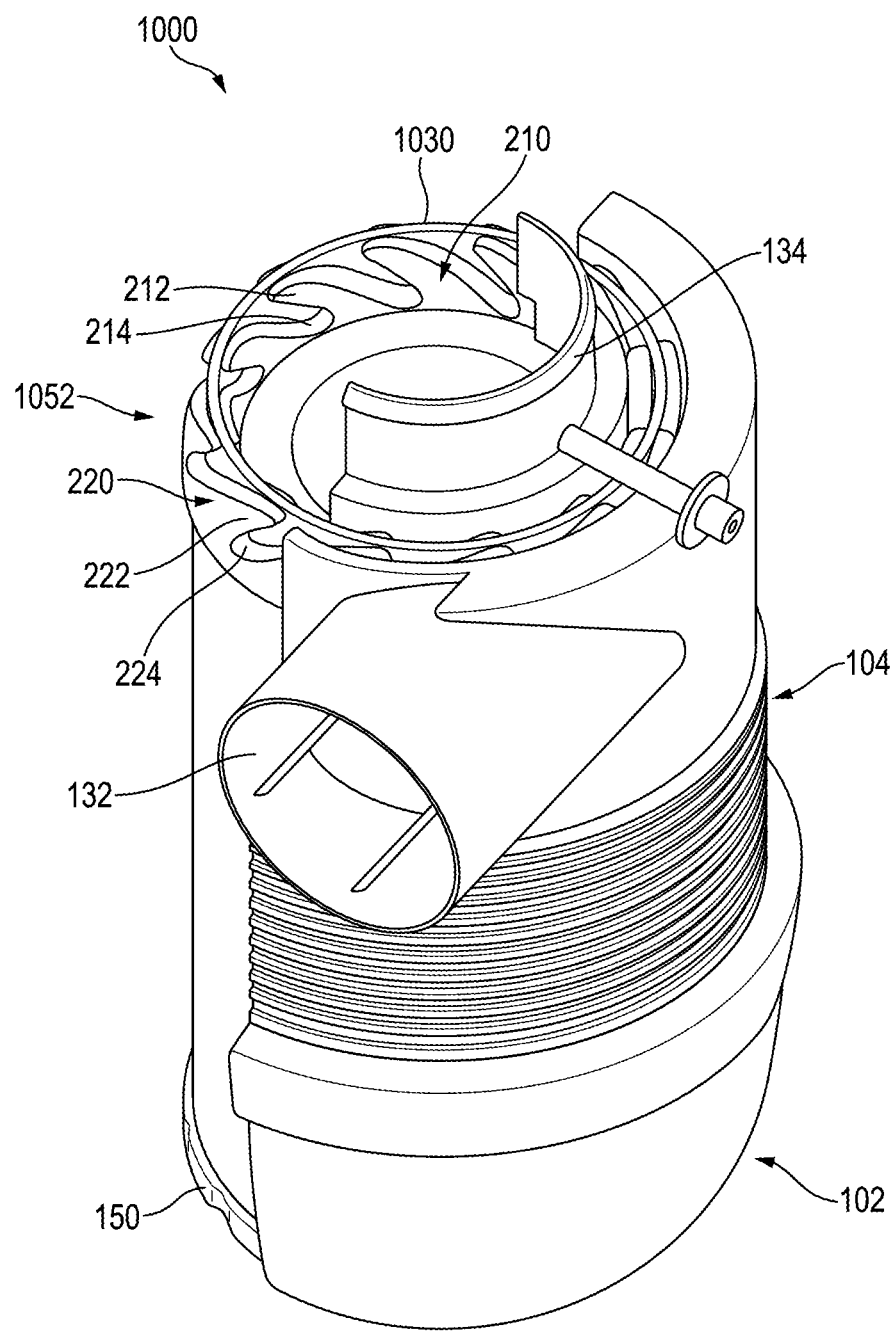
FIG. 10 is a top perspective view of a cross-section of a filter assembly with a filter seal member, according to another embodiment.
Figure 11A:
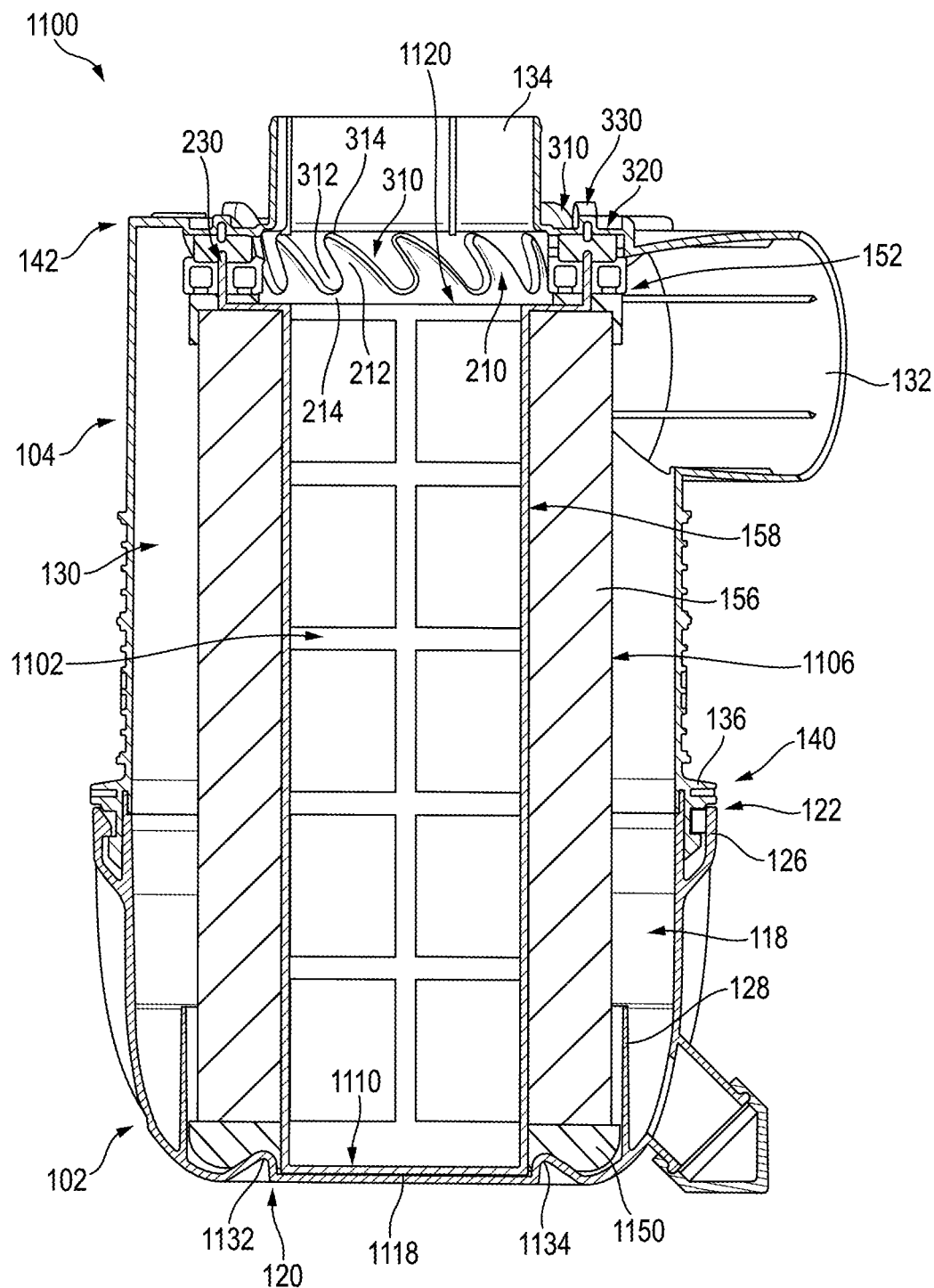
FIG. 11A is cross-sectional side view of the filter assembly with a centertube and a filter seal member, according to another example embodiment.
Figure 11B:
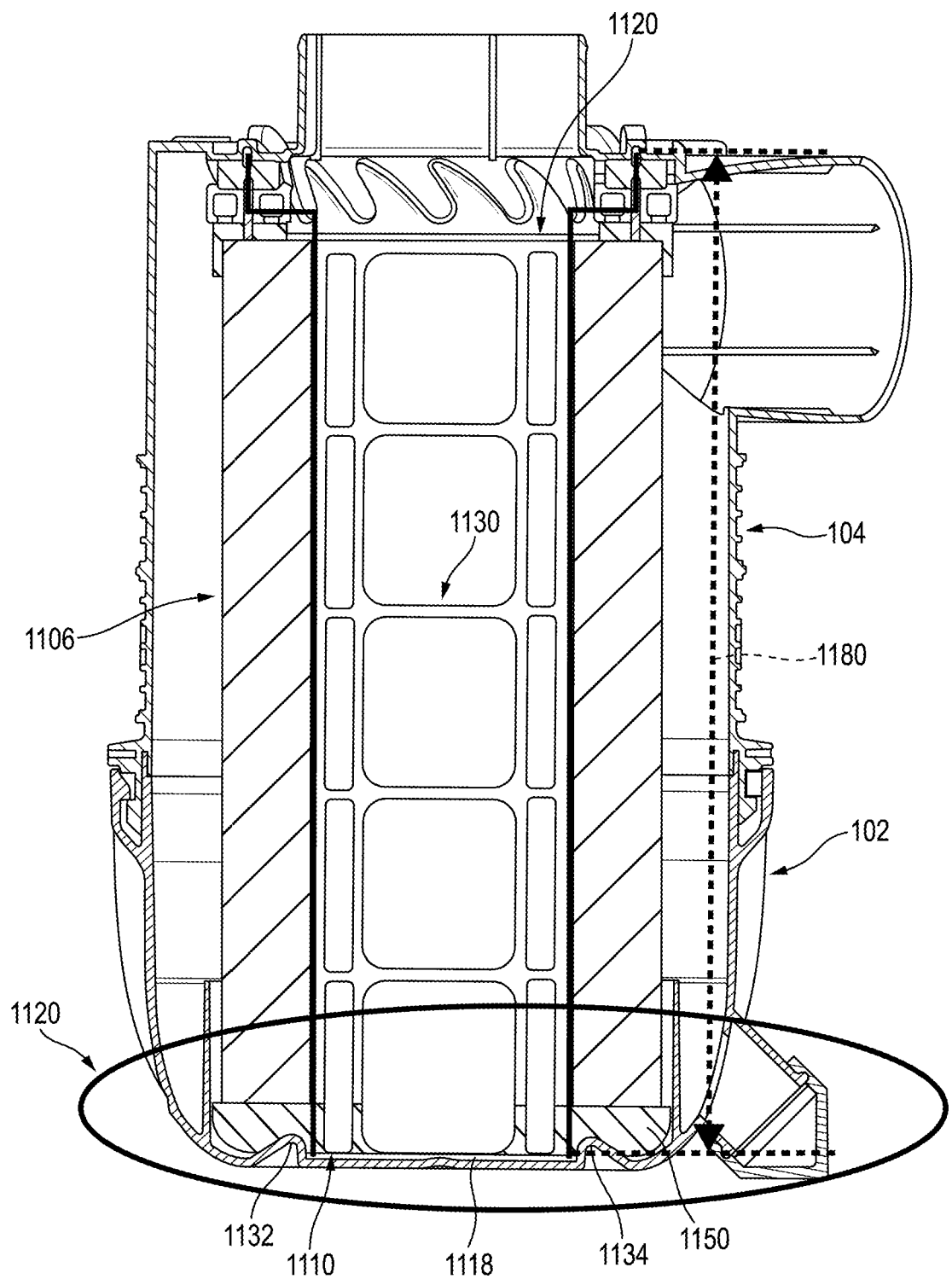
FIG. 11B is cross-sectional side view of a portion of the filter assembly of FIG. 11A.
Figure 12A:
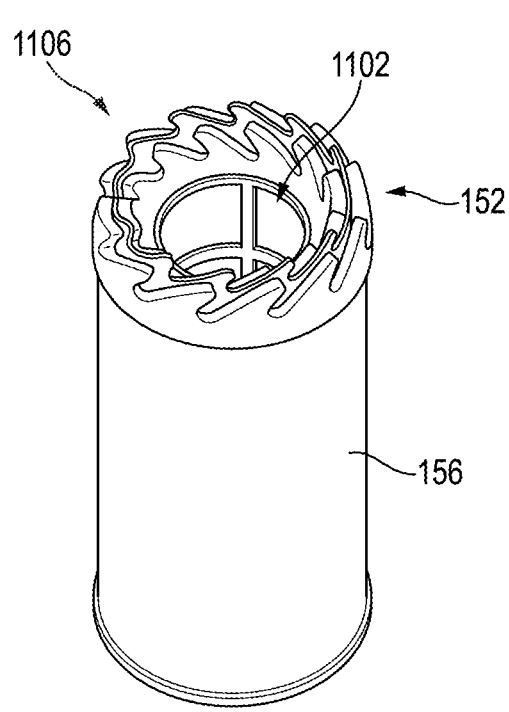
FIGS. 12A and 12B are perspective views of the filter element of the filter assembly of FIG. 11A.
Figure 12B:
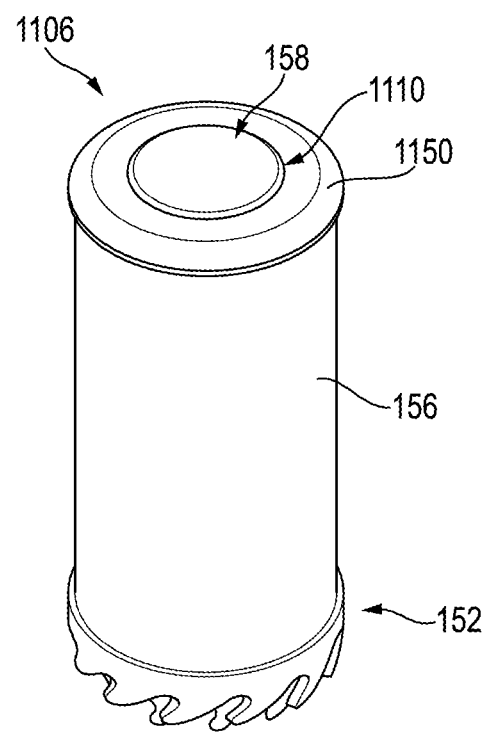
Figure 12C:
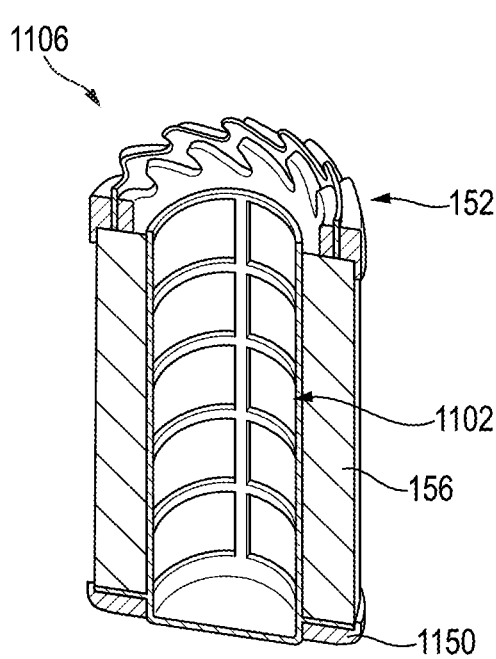
FIGS. 12C and 12D are cross-sectional perspective views of the filter element of the filter assembly of FIGS. 12A and 12B.
Figure 12D:
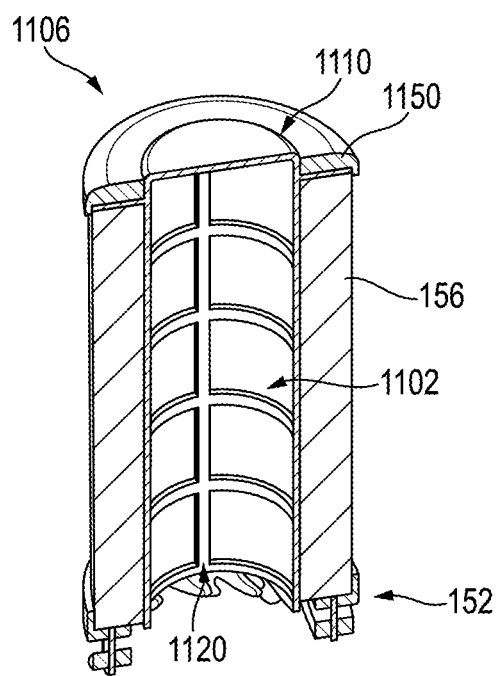

FIG. 10 shows a top perspective view of a cross-section of a filter assembly 1000 with a filter seal member 1052. The filter assembly 1000 is similar to the filter assembly 100. A difference between the filter assembly 1000 and the filter assembly 100 is the filter assembly 1000 includes a support ring 1030 that is substantially flat. Accordingly, like numbering is used to designate like parts between the filter assembly 1000 and the filter assembly 100. The filter assembly includes the filter element 106 with a filter seal member 1052. The filter seal member 1052 includes a substantially flat support ring 1030 (e.g., no hook openings) that is disposed above the plurality of lobes.

FIGS. 11A-12D show a cross-sectional side view of a filter assembly 1100 with a centertube 1102, according to an example embodiment. The filter assembly 1100 is similar to the filter assembly 100 of FIG. 1. Except as otherwise noted, like numbering is used to designate like parts between the filter assembly 1100 and the filter assembly 100. A difference between the filter assembly 1100 and the filter assembly 100 is the filter assembly 1100 includes a centertube 1102 as the filter seal engagement member. The filter assembly 1100 includes a cover 102, a filter housing 104, a filter element 1106 disposed between the cover 102 and the filter housing 104, and a centertube 1102. The filter assembly 1100 includes a centertube 1202 disposed within a filter element 1106 that is configured to facilitate a filter seal member 152 of the filter element 1106 to engage a complementary housing seal member 252 formed in a filter housing. The filter housing 104 includes an inlet 132 and an outlet 134. A portion of the filter element 1106 is disposed in an internal cover cavity 118 of the cover 102 and another portion of the filter element 1106 is disposed within an internal housing cavity 130 of the filter housing 104.

The filter element 1106 includes the filter endplate 1150, a filter seal member 152 disposed axially away from the filter endplate 150, and filter media 156 disposed between the filter endplate 1150 and the filter seal member 152. The filter seal member 152 of the filter element 1106 is similar to the filter seal member 152 of the filter element 106 and is configured to engage a complementary housing seal member 252 of the filter housing 104, as described above in FIGS. 3A-7D. Although the filter media 156 is shown arranged as a cylindrical filter block having a circular cross-sectional shape, the filter media 156 can be arranged in other shapes (e.g., racetrack or oval shapes). The filter media 156 may comprise, for example, pleated filter media arranged in a panel or pleat block, or corrugated filter media that is arranged in a panel, a block, a cylinder, a racetrack, or other arrangements. The filter element 106 may be substantially rigid such that the shape of the filter element 106 is substantially maintained during installation and use. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.). The filter media 156 defines an internal filter media cavity 158.

Figure 13A:
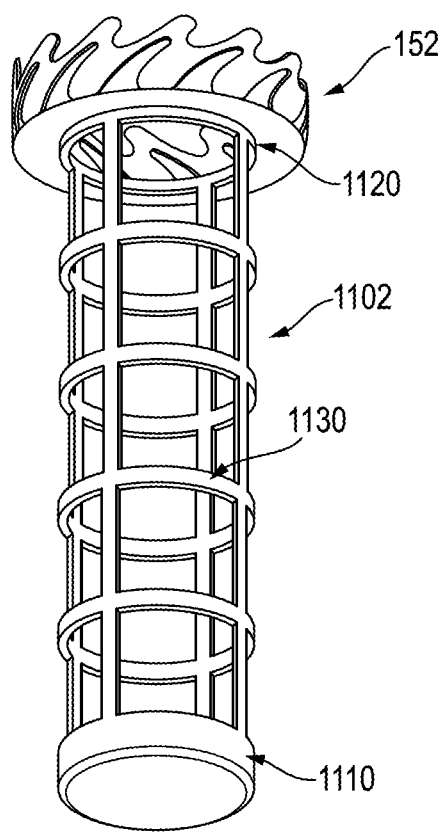
FIG. 13A is a perspective view of the centertube of the filter element of the filter assembly of FIG. 11A.
Figure 13B:
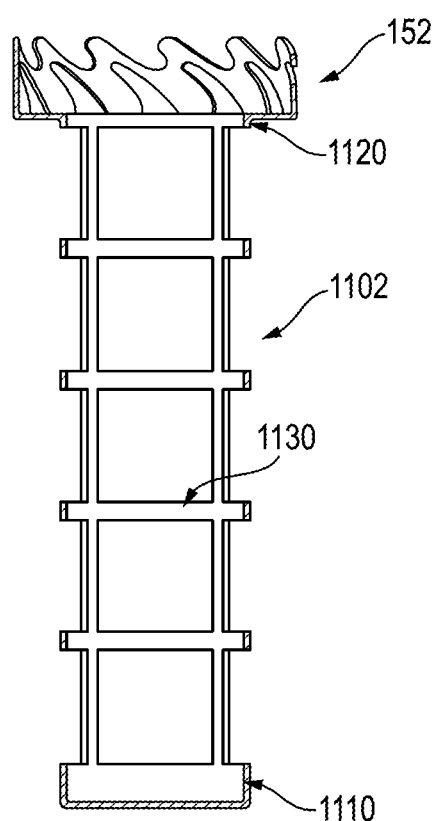
FIG. 13B is a cross-sectional view of the centertube of FIG. 13A.

The centertube 1102 is disposed within the internal filter media cavity 158 and includes a first centertube end 1110, a second centertube end 1120 disposed axially away from the first centertube end 1110, and a plurality of ribs 1130 disposed between the first centertube end 1110 and the second centertube end 1120. The plurality of ribs 1130 are configured to provide structural support to the filter media 156 and filter element 1106, while minimizing interference with fluid flow through the filter media 156 to the outlet 134. As shown in FIGS. 13A and 13B, in some embodiments, the centertube 1102 may be molded with the filter seal member 152 to form a single unit. In those embodiments, forming the centertube 1102 with the filter seal member 152 as a single unit ensures that the filter element 1106 has the proper filter element height 1180 to engage the cover 102 and properly seal the filter seal member 152 and the housing seal member 252.

Referring to FIGS. 11A-12D, the cover 102 includes a first cover end 120 and a second cover end 122, which cooperate to define an internal cover cavity 118. The second cover end 122 includes a cover coupling member 126 that is configured to engage a complementary housing coupling member 136 on the filter housing 104. The cover coupling member 126 may be a rotational coupling member that forms a cavity configured to receive a protruding coupling member in rotational manner that couples (e.g., locks) the cover 102 to the filter housing 104. The first cover end 120 includes a filter element guidance channel 128, a centertube cavity 1118, a first protruding cover member 1132, and a second protruding cover member 1134. The filter element guidance channel 128 is configured to provide installation guidance and support for the filter element 1106. The filter element guidance channel 128 is configured to receive an end of the filter endplate 1150 of the filter element 1106. In some embodiments, the filter element guidance channel 128 extends past the endplate 1150 and is adjacent to a portion of the filter media 156. In some embodiments, the filter element guidance channel 128 and the filter endplate 1150 engage to form a fluidly-tight seal to prevent fluid from bypassing the filter media 156.

The centertube cavity 1118 is positioned between the first protruding cover member 1132 and the second protruding cover member 1134. The centertube cavity 1118 is configured to receive the first centertube end 1110 such that the filter element height 1180 extends from the first cover end 120 to the second housing end 142 to exert the load (e.g., compressive force) onto the filter element 106 and filter housing 104 when the cover 102 is coupled to the filter housing 104. In other words, as the cover 102 is coupled to the filter housing 104 the first centertube end 1110 contacts the centertube cavity 1118 and forces the inner and outer seal portions of the filter element to engage and form a seal with the complementary sealing portion of the filter housing 104. The first protruding cover member 1132 and the second protruding cover member 1134 contact the filter endplate 1150. In some embodiments, the first protruding cover member 1132 and the second protruding cover member 1134 are configured to exert a load onto the filter element 106 and filter housing 104 when the cover 102 is coupled to the filter housing 104 along with the centertube 1102. In some embodiments, the engagement and distribution of loads are similar to the load distribution shown in FIGS. 8A and 8B such that the compressive force of the centertube 1102 impedes jostling, movement, etc. of the filter element 1106 under vibration and oscillation.

Figure 14:
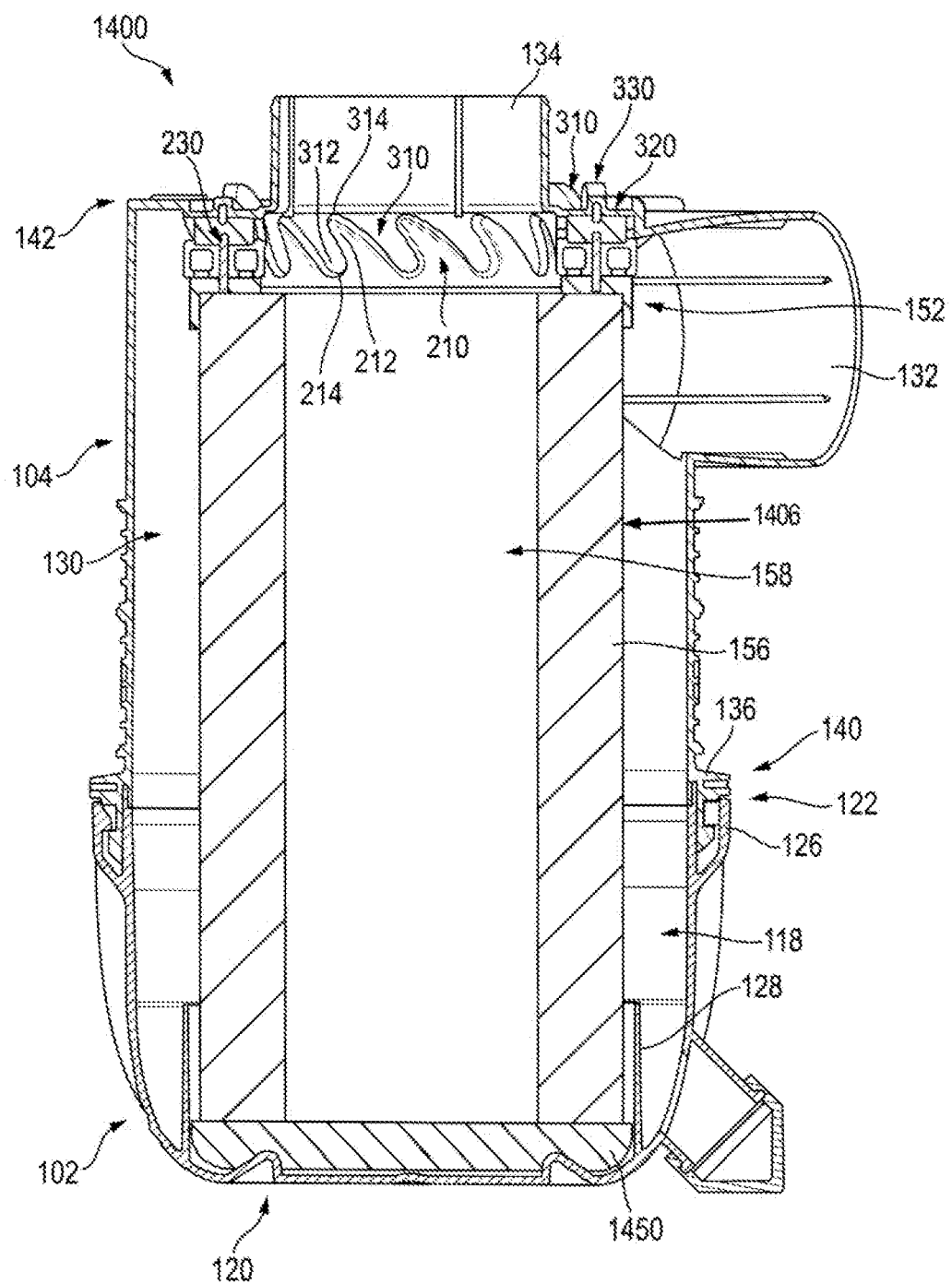
FIG. 14 is cross-sectional side view of the filter assembly with an endplate and a filter seal member, according to another example embodiment.
Figure 15:
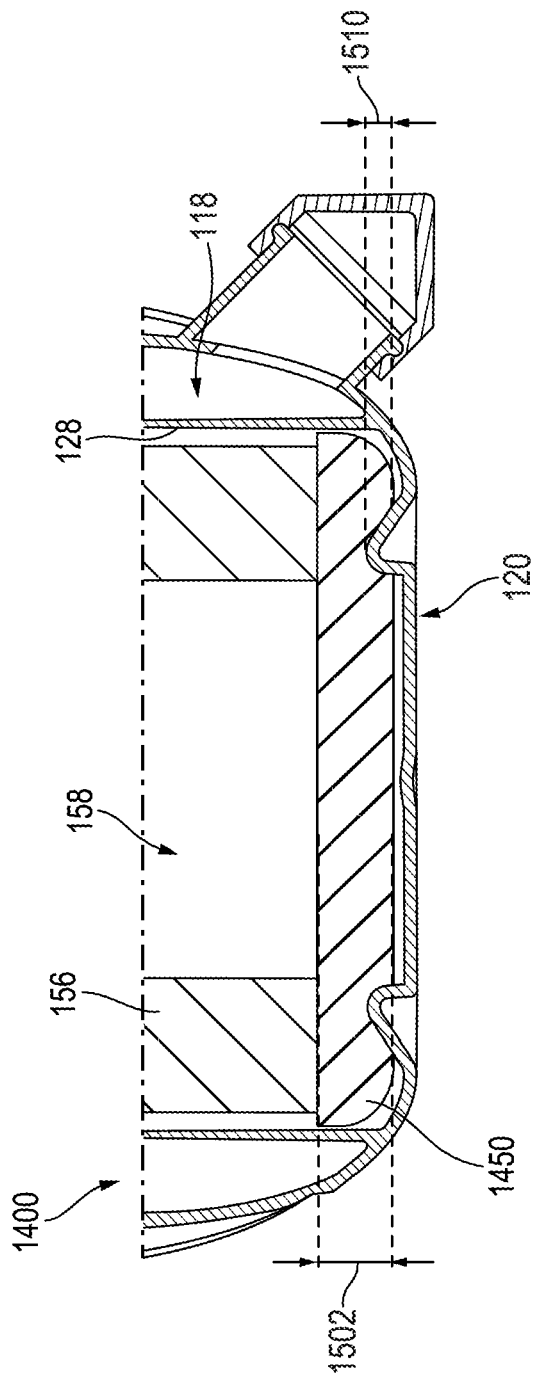
FIG. 15 is cross-sectional side view of a portion of the filter assembly of FIG. 14.

FIGS. 14 and 15 show a cross-sectional side view of a filter assembly 1400 with a thick filter endplate 1450, according to an example embodiment. The filter assembly 1400 is similar to the filter assembly 100 of FIG. 1. Except as otherwise noted, like numbering is used to designate like parts between the filter assembly 1400 and the filter assembly 100. A difference between the filter assembly 1400 and the filter assembly 100 is the filter assembly 1400 includes a thicker filter endplate 1450 as the filter seal engagement member. The filter assembly 1400 includes a cover 102, a filter housing 104, and a filter element 1406 disposed between the cover 102 and the filter housing 104. The filter assembly 1400 includes a filter endplate 1450 that is on an end of a filter element 1406 and is configured to facilitate a filter seal member 152 of the filter element 1406 to engage a complementary housing seal member 252 formed in a filter housing 104. The filter housing 104 includes an inlet 132 and an outlet 134. A portion of the filter element 1406 is disposed in an internal cover cavity 118 of the cover 102 and another portion of the filter element 1406 is disposed within an internal housing cavity 130 of the filter housing 104.

The filter element 1406 includes the filter endplate 1450, a filter seal member 152 disposed axially away from the filter endplate 1450, and filter media 156 disposed between the filter endplate 1450 and the filter seal member 152. The filter endplate 1450 is configured to have a sufficient thickness to provide a filter element 1406 height to abut the first cover end 120 and provide sufficient compressive force on the filter seal member 152 and housing seal member 252 when the filter element 1406 is disposed within the cover 102 coupled to the filter housing 104. As shown in FIG. 15, when the cover 102 is coupled to the filter housing 104, the filter element 1406 is disposed between the filter housing 104 and cover 102 and the filter endplate 1450 has an endplate height 1502 such that the filter endplate 1450 compresses 1510 against the first cover end 120 and, in turn, presses the filter seal member 152 into engagement with the housing seal member 252 on the opposite end of the filter element 1406. In some embodiments, the engagement and distribution of loads are similar to the load distribution shown in FIGS. 8A and 8B such that the compressive force of the filter endplate 1450 impedes jostling, movement, etc. of the filter element 1406 under vibration and oscillation.

The filter seal member 152 of the filter element 1406 is similar to the filter seal member 152 of the filter element 106 and is configured to engage a complementary housing seal member 252 of the filter housing 104, as described above in FIGS. 3A-7D. Although the filter media 156 is shown arranged as a cylindrical filter block having a circular cross-sectional shape, the filter media 156 can be arranged in other shapes (e.g., racetrack or oval shapes). The filter media 156 may comprise, for example, pleated filter media arranged in a panel or pleat block, or corrugated filter media that is arranged in a panel, a block, a cylinder, a racetrack, or other arrangements. The filter element 106 may be substantially rigid such that the shape of the filter element 106 is substantially maintained during installation and use. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.). The filter media 156 defines an internal filter media cavity 158.

Referring to FIGS. 14 and 15, the cover 102 includes a first cover end 120 and a second cover end 122, which cooperate to define an internal cover cavity 118. The second cover end 122 includes a cover coupling member 126 that is configured to engage a complementary housing coupling member 136 on the filter housing 104. The cover coupling member 126 may be a rotational coupling member that forms a cavity configured to receive a protruding coupling member in rotational manner that couples (e.g., locks) the cover 102 to the filter housing 104. The first cover end 120 includes a filter element guidance channel 128. The filter element guidance channel 128 is configured to provide installation guidance and support for the filter element 1406. The filter element guidance channel 128 is configured to receive an end of the filter endplate 1450 of the filter element 1406. In some embodiments, the filter element guidance channel 128 extends past the endplate 1450 and is adjacent to a portion of the filter media 156. In some embodiments, the filter element guidance channel 128 and the filter endplate 1450 engage to form a fluidly-tight seal to prevent fluid from bypassing the filter media 156.

The centertube cavity 1118 is positioned between the first protruding cover member 1132 and the second protruding cover member 1134. The centertube cavity 1118 is configured to receive the first centertube end 1110 such that the filter element height 1180 extends from the first cover end 120 to the second housing end 142 to exert the load (e.g., compressive force) onto the filter element 1406 and filter housing 104 when the cover 102 is coupled to the filter housing 104. In other words, as the cover 102 is coupled to the filter housing 104 the first centertube end 1110 contacts the centertube cavity 1118 and forces the inner and outer seal portions of the filter element to engage and form a seal with the complementary sealing portion of the filter housing 104. The first protruding cover member 1132 and the second protruding cover member 1134 contact the filter endplate 1450. In some embodiments, the first protruding cover member 1132 and the second protruding cover member 1134 are configured to exert a load onto the filter element 106 and filter housing 104 when the cover 102 is coupled to the filter housing 104 along with the centertube 1102.

FIGS. 16A-16D show a side view of filter elements having different filter seal member configurations on an end of the respective filter elements. In FIG. 16A, a filter element 1600 is shown having a closed endplate 1614 and a filter seal member 1602. The filter seal member 1602 includes a plurality of lobes, a plurality of channels, and a support ring. The filter seal member 1602 has a seal radius 1612 equal to the endplate radius 1610. Referring to FIG. 16B, a filter element 1620 is shown having a closed endplate 1634 and a filter seal member 1622. The filter seal member 1622 includes a plurality of lobes, a plurality of channels, and a support ring. The filter seal member 1622 has a seal radius 1632 equal to the endplate radius 1630. Referring to FIG. 16C, a filter element 1640 is shown having a closed endplate 1654 and a filter seal member 1642. The filter seal member 1642 includes a plurality of disconnected lobes, a plurality of channels, and a support ring. The filter seal member 1642 has a seal radius 1652 that is greater than the endplate radius 1650. Referring to FIG. 16D, a filter element 1660 is shown having a closed endplate 1674 and a filter seal member 1662. The filter seal member 1662 includes a support ring and internal only seal members. The filter seal member 1662 has a seal radius 1672 that is equal to the endplate radius 1670 (in part due to the lack of an external seal). In some embodiments, one or more of the filter elements of FIGS. 16A-16D has an internal set of lobes and/or channels. The filter seal mold can be altered and configured to generate a wide variety of filter seal member elements. While the filter seal members are shown on one end of the respective filter elements, the filter seal members may be disposed on both sides of the filter element.

Turning to FIG. 17A, a filter seal member 1700 is shown, according to an example embodiment. The filter seal member 1700 includes a plurality of lobes 1702 and a plurality of guide channels 1704. Each lobe in the plurality of lobes are separated by a periodicity angle 1710 that is associated with the number of lobes in the plurality of lobes 1702. As shown in FIG. 17A, the filter seal member includes eighteen lobes in the plurality of lobes 1702 and has a periodicity angle of twenty-degrees. In some embodiments, the filter seal member 1700 may include an orientation lobe 1715 that extends radially away from the filter seal member 1700 further than seventeen of the eighteen lobes in the plurality of lobes 1702. While seventeen of the eighteen lobes in the plurality of lobes 1702 are shown as extending away from the filter seal member 1700 a distance of L, the orientation lobe 1715 may extend axially away from the filter seal member 1700 at a distance different than L, shown as 2L. In some embodiments, the filter seal member 1700 is configured to be received by a filter housing having a seal member configured to receive the filter seal member 1700 in a single orientation. Referring to FIG. 17B, a filter seal member 1750 formed using a protective seal mold is shown, according to an example embodiment. The filter seal member includes a plurality of lobes 1752 and a plurality of guide channels 1754. Each lobe in the plurality of lobes are separated by a periodicity angle 1760 that is associated with the number of lobes in the plurality of lobes 1752. As shown in FIG. 17B, the filter seal member includes nine lobes in the plurality of lobes 1752 and has a periodicity angle of forty-degrees. As will be appreciated, filter seal members having lobes of 1, 2, 3, 4, 5, 6, 8, 10, 12, 15, 18, 20, 24, 30, 36, 48, 60, 72, 90, 100, 120, 190, or 360 lobes may be implemented having periodicity angles of 360, 180, 120, 90, 72, 60, 45, 36, 30, 24, 20, 18, 15, 12, 10, 7.5, 6, 5, 4, 3.6, 3, and 1-degrees, respectively. Other numbers of lobes (and periodicity angles) are also possible. As will be readily apparent, any change to the number, shape, location, angle, etc. of the lobes of the filter seal member will result in a change to the number, shape, location, angle, of mold lobes in the protective seal mold. In some embodiments, the filter seal member is disposed on both ends of the filter element.

It is understood that the various components, configurations, and features of the different embodiments of the filter seal member, cover, and/or filter housing may be combined according to the desired use and configuration.

The term "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, unless otherwise specifically noted, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly comprising:
   a filter housing comprising:
      a first housing end and a second housing end disposed axially away from the first housing end, the first housing end and the second housing end defining an internal cavity therebetween;
      a first coupling member adjacent to the first housing end; and
      a housing seal member formed on the second housing end, the housing seal member comprising a first engagement portion;
   a filter element disposed in the internal cavity, the filter element comprising:
      filter media comprising a first media end and a second media end disposed axially away from the first media end;
      a first endplate disposed at the first media end;
      a second endplate disposed at the second media end; and
      a filter seal member formed on the second endplate, the filter seal member comprising a second engagement portion, the second engagement portion configured to engage the first engagement portion of the housing seal member; and
   a cover, comprising:
      a first cover end;
      a second cover end disposed axially away from the first cover end;
      a second coupling member adjacent to the second cover end, the second coupling member configured to engage the first coupling member to couple the cover and the filter housing; and an interface plate configured to press against the first endplate to secure the engagement of the first engagement portion and the second engagement portion.

2. The filter assembly of claim 1, wherein the cover further comprises a biasing member coupled to the first cover end and contacting the interface plate.

3. The filter assembly of claim 2, wherein the first engagement portion comprises:
a first housing seal end;
a second housing seal end disposed axially away from the first housing seal end;
a first housing seal surface disposed between the first housing seal end and the second housing seal end, the first housing seal surface comprising at least one lobe and at least one guide channel;
a second housing seal surface disposed between the first housing seal end and the second housing seal end and disposed radially away from the first housing seal surface; and
a ring cavity defined between the first housing seal surface and the second housing seal surface, the ring cavity configured to receive a support ring of the second engagement portion; and
wherein the second engagement portion comprises:
a first filter seal end;
a second filter seal end disposed axially away from the first filter seal end;
a first filter seal surface disposed between the first filter seal end and the second filter seal end, the first filter seal surface comprising at least one lobe and at least one guide channel;
a second filter seal surface disposed between the first filter seal end and the second filter seal end and disposed radially away from the first filter seal surface; and
a support ring disposed between the first filter seal surface and the second filter seal surface, the support ring configured to engage the ring cavity of the first engagement portion,
wherein the biasing member is configured to bias the interface plate in a direction toward the first endplate, causing the interface plate to press against the first endplate and push the first engagement portion to engage with the second engagement portion and form a seal between the filter seal member and the housing seal member.

4. The filter assembly of claim 3, wherein the at least one lobe is a plurality of lobes and the at least one guide channel is a plurality of guide channels, each guide channel in the plurality of guide channels disposed between a pair of lobes in the plurality of lobes.

5. The filter assembly of claim 3, wherein the first engagement portion is configured to form a seal with the second engagement portion when the support ring is received by the ring cavity.

6. The filter assembly of claim 1, wherein the first engagement portion comprises:
a first inner housing lobe, a second inner housing lobe, and an inner housing guide channel, the inner housing guide channel disposed between the first inner housing lobe and the second inner housing lobe, the first inner housing lobe being non-parallel to the second inner housing lobe; and wherein the second engagement portion comprises:
a first inner filter lobe, a second inner filter lobe, and an inner filter guide channel, the inner filter guide channel disposed between the first inner filter lobe and the second inner filter lobe, the first inner filter lobe being non-parallel to the second inner filter lobe, wherein the engagement of the first engagement portion and the second engagement portion is a translative and rotative engagement of the inner filter guide channel receiving the first inner housing lobe and the a translative and rotative engagement of the inner housing guide channel receiving the first inner filter lobe.

7. The filter assembly of claim 6, wherein the cover further comprises a biasing member coupled to the first cover end and contacting the interface plate, and wherein the first engagement portion is configured to form a seal with the second engagement portion, the biasing member configured to secure the seal.

8. The filter assembly of claim 1, wherein the first engagement portion comprises:
a first outer housing lobe, a second outer housing lobe, and an outer housing guide channel, the outer housing guide channel disposed between the first outer housing lobe and the second outer housing lobe, the first outer housing lobe being non-parallel to the second outer housing lobe; and wherein the second engagement portion comprises:
a first outer filter lobe, a second outer filter lobe, and an outer filter guide channel, the outer filter guide channel disposed between the first outer filter lobe and the second outer filter lobe, the first outer filter lobe being non-parallel to the second outer filter lobe, wherein the engagement of the first engagement portion and the second engagement portion is a translative and rotative engagement of the outer filter guide channel receiving the first outer housing lobe and the a translative and rotative engagement of the outer housing guide channel receiving the first outer filter lobe.

9. The filter assembly of claim 8, wherein the cover further comprises a biasing member coupled to the first cover end and contacting the interface plate, and wherein the first engagement portion is configured to form a seal with the second engagement portion, the biasing member configured to secure the seal.

10. A filter element comprising:
filter media comprising a first media end and a second media end disposed axially away from the first media end;
a first endplate disposed at the first media end;
a filter seal member formed on the first endplate, the filter seal member comprising an inner sealing portion and an outer sealing portion radially separated by a support ring, the first seal member configured to engage an engagement portion of a filter housing when the filter element is disposed within an internal cavity of the filter housing; and
a second endplate disposed at the second media end, the second endplate configured to receive an interface plate so as to secure the engagement of the first engagement portion and the second engagement portion.

11. The filter element of claim 10, wherein the interface plate is biased by a biasing member.

12. The filter element of claim 10, wherein the filter seal member includes a first plurality of lobes defining a first plurality of guide channels configured to receive a second plurality of lobes of the filter housing.

13. The filter element of claim 10, wherein the support ring extends from the filter seal member and is configured to be received by a ring cavity of the filter housing.

14. The filter element of claim 13, wherein the support ring comprises a plurality of hook elements configured to be inserted into a plurality of locking pockets of the filter housing.

15. The filter element of claim 10, wherein the filter seal member comprises a plurality of inner lobes and a plurality of outer lobes, the plurality of inner lobes angularly offset from the plurality of outer lobes.

16. The filter element of claim 15, wherein the support ring separates the inner plurality of lobes from the outer plurality of lobes, the support ring comprising a plurality of hook elements extending axially away from the filter seal member in a direction opposite the filter media.

17. A filter housing comprising:
a first housing end and a second housing end disposed axially away from the first housing end, the first housing end and the second housing end defining an internal cavity therebetween;
a first coupling member adjacent to the first housing end; and
a housing seal member formed on the second housing end, the housing seal member comprising an engagement end, the engagement end comprising:
at least one inner lobe and at least one inner guide channel;
at least one outer lobe and at least one outer guide channel; and
a ring cavity defined between the at least one inner lobe and the at least one outer lobe.

18. The filter housing of claim 17, wherein the at least one outer lobe and the at least one inner lobe are angularly offset by a non-zero angle.

19. The filter housing of claim 17, wherein the ring cavity comprises at least one locking pocket, each of the at least one locking pocket comprising a pocket cavity configured to receive a hook projection from a filter element.

20. The filter element of claim 17, wherein the ring cavity comprises at least one locking pocket, each of the at least the locking pocket comprising an aperture configured to receive a portion of a filter element so the portion of the filter element is visible from outside the internal cavity when the filter element is positioned within the internal cavity.

\* \* \* \* \*